(12) United States Patent
Mitteer

(10) Patent No.: US 8,117,938 B2
(45) Date of Patent: Feb. 21, 2012

(54) SHIFTER WITH SHAPE MEMORY ALLOY AND SAFETY

(75) Inventor: David M. Mitteer, Shelby, MI (US)

(73) Assignee: GHSP, Inc., Grand Haven, MI (US)

( * ) Notice: Subject to any disclaimer, the term of this patent is extended or adjusted under 35 U.S.C. 154(b) by 805 days.

(21) Appl. No.: 12/247,380

(22) Filed: Oct. 8, 2008

(65) Prior Publication Data

US 2009/0025501 A1 Jan. 29, 2009

Related U.S. Application Data

(63) Continuation-in-part of application No. 11/772,972, filed on Jul. 3, 2007, now Pat. No. 7,814,810.

(60) Provisional application No. 60/818,594, filed on Jul. 5, 2006.

(51) Int. Cl.
*B60K 20/04* (2006.01)

(52) U.S. Cl. .................. 74/473.23; 74/473.22

(58) Field of Classification Search ............. 74/473.1, 74/473.12–473.13, 473.21–473.26; 310/206; 60/527, 528

See application file for complete search history.

(56) References Cited

U.S. PATENT DOCUMENTS

| | | | |
|---|---|---|---|
| 3,652,969 A | 3/1972 | Willson et al. | |
| 4,275,370 A | 6/1981 | Sims | |
| 4,699,235 A | 10/1987 | Anderson | |
| 4,700,541 A | 10/1987 | Gabriel et al. | |
| 4,754,734 A | 7/1988 | Ohkoshi | |
| 4,761,955 A | 8/1988 | Bloch | |
| 4,823,035 A | 4/1989 | Kudla et al. | |
| 4,829,843 A | 5/1989 | Suzuki | |
| 4,884,780 A | 12/1989 | Ohashi | |
| 4,887,430 A | 12/1989 | Kroll et al. | |
| 4,914,908 A | 4/1990 | Sugiyama et al. | |
| 4,965,545 A | 10/1990 | Johnson | |
| 4,979,672 A | 12/1990 | AbuJudom | |
| 5,092,941 A | 3/1992 | Miura | |
| 5,176,544 A | 1/1993 | AbuJudom | |
| 5,233,884 A | 8/1993 | Rochte | |
| 5,277,077 A * | 1/1994 | Osborn ................ 74/473.21 |
| 5,419,788 A * | 5/1995 | Thoma et al. ............... 148/402 |
| 5,771,742 A | 6/1998 | Bokaie et al. | |
| 6,121,588 A | 9/2000 | Cerruti | |

(Continued)

FOREIGN PATENT DOCUMENTS

EP 1479921 11/2004

(Continued)

*Primary Examiner* — Richard W Ridley
*Assistant Examiner* — Terence Boes
(74) *Attorney, Agent, or Firm* — Price Heneveld LLP

(57) ABSTRACT

A shifter incorporates a shape memory alloy wire (SMA actuator) to control movement of a blocker to selectively prevent moving a shift lever (or pawl) out of its park position until predetermined vehicle conditions are met. A mechanical fuse (i.e., flexible overload spring) prevents damage to the SMA actuator where the shift lever (or pawl) can be frictionally stopped from movement despite the contraction of the SMA actuator. The control circuit for the SMA actuator includes a photo-electric switch for stopping electrical power to the SMA actuator when the shift lever is moved from its park position, and the shift lever includes structure for mechanically continuing to hold the switch open while out of park. Further, the control circuit is operably connected to an ignition key retaining mechanism so that the ignition key cannot be removed when the lever is not in its park position.

13 Claims, 18 Drawing Sheets

U.S. PATENT DOCUMENTS

| | | |
|---|---|---|
| 6,310,411 B1 | 10/2001 | Viallet |
| 6,364,496 B1 | 4/2002 | Boddy et al. |
| 6,374,608 B1 | 4/2002 | Corris et al. |
| 6,390,878 B1 | 5/2002 | Zhou et al. |
| 6,404,098 B1 | 6/2002 | Kayama |
| 6,459,855 B1 | 10/2002 | Kosaka et al. |
| 6,574,958 B1 | 6/2003 | MacGregor |
| 6,684,724 B2 | 2/2004 | Narasimhiah et al. |
| 6,732,516 B2 | 5/2004 | Butera et al. |
| 6,762,669 B2 | 7/2004 | Alacqua et al. |
| 6,813,886 B2 | 11/2004 | Cerruti et al. |
| 6,832,477 B2 | 12/2004 | Gummin et al. |
| 6,851,260 B2 | 2/2005 | Mernoe |
| 6,899,213 B1 | 5/2005 | Lohss |
| 7,779,715 B2 * | 8/2010 | Mitteer ............... 74/473.23 |
| 7,814,810 B2 * | 10/2010 | Mitteer ............... 74/473.1 |
| 2004/0261411 A1 | 12/2004 | MacGregor |
| 2005/0146147 A1 | 7/2005 | Niskanen |
| 2005/0160858 A1 | 7/2005 | Mernoe |
| 2006/0208500 A1 | 9/2006 | Brown |
| 2009/0043288 A1 * | 2/2009 | Petrakis ............... 604/890.1 |

FOREIGN PATENT DOCUMENTS

| | | |
|---|---|---|
| GB | 2148444 | 5/1985 |
| GB | 2182747 | 5/1987 |
| JP | 05 057507 U | 7/1993 |
| JP | 07-006556 U | 1/1995 |
| KR | 10-2001-0028339 A | 4/2001 |
| WO | WO 2008-006021 A2 | 1/2008 |

* cited by examiner

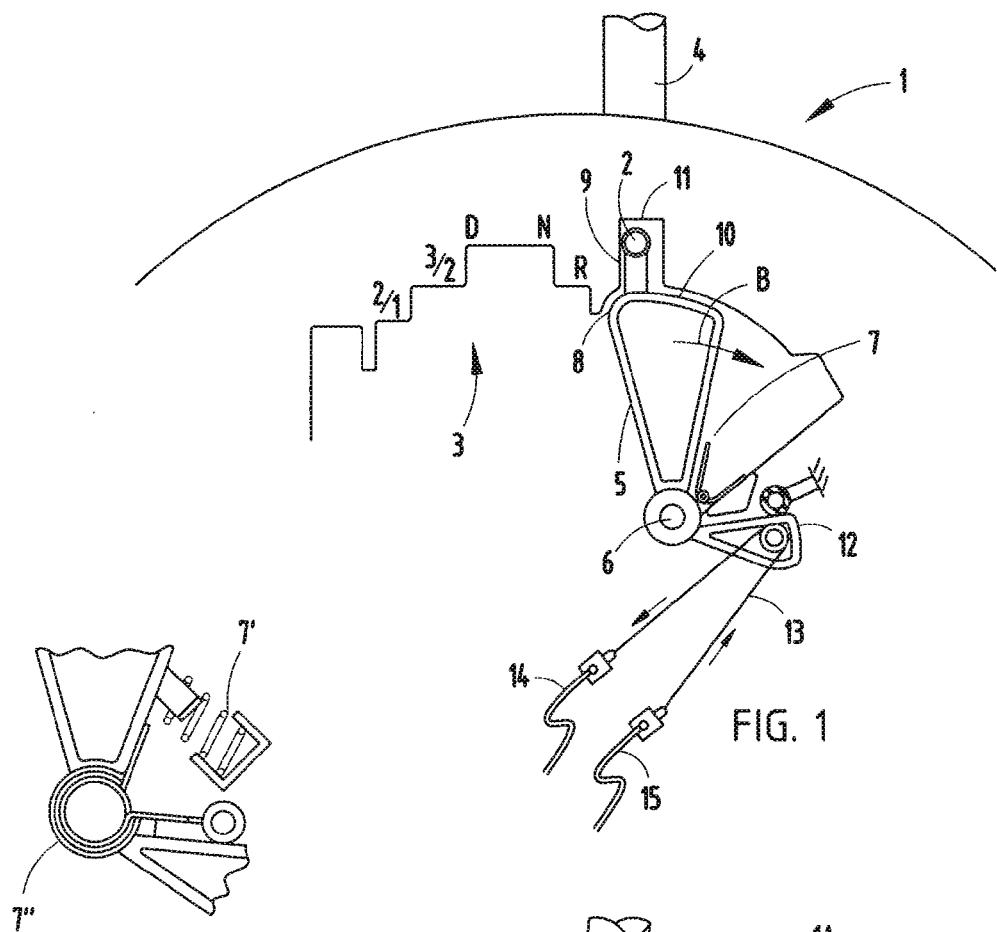
FIG. 1
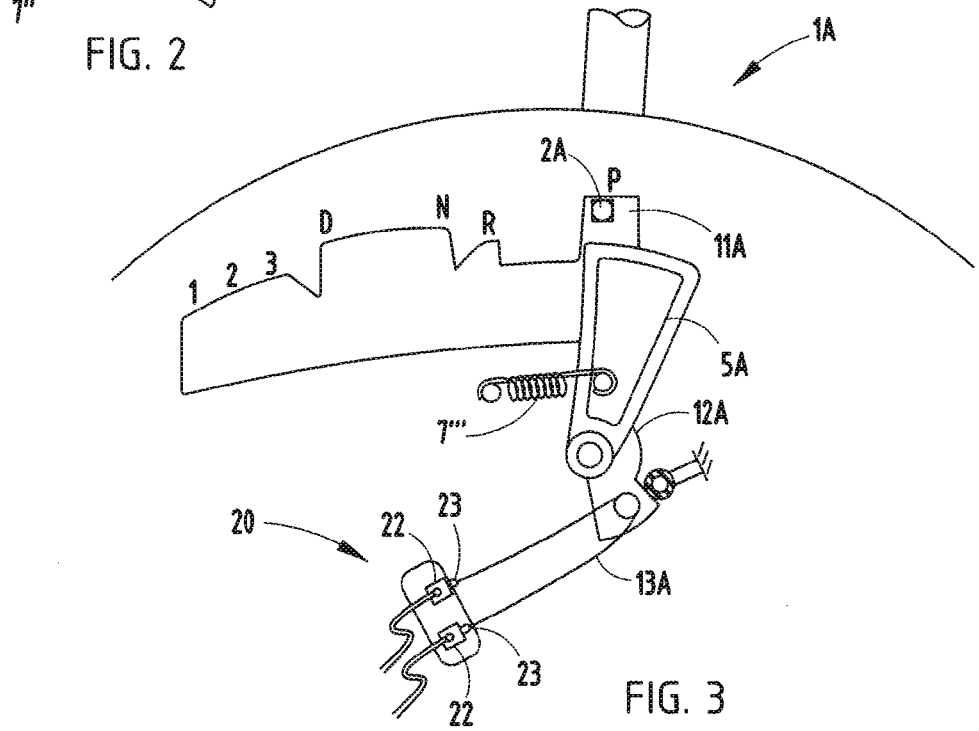
FIG. 2
FIG. 3

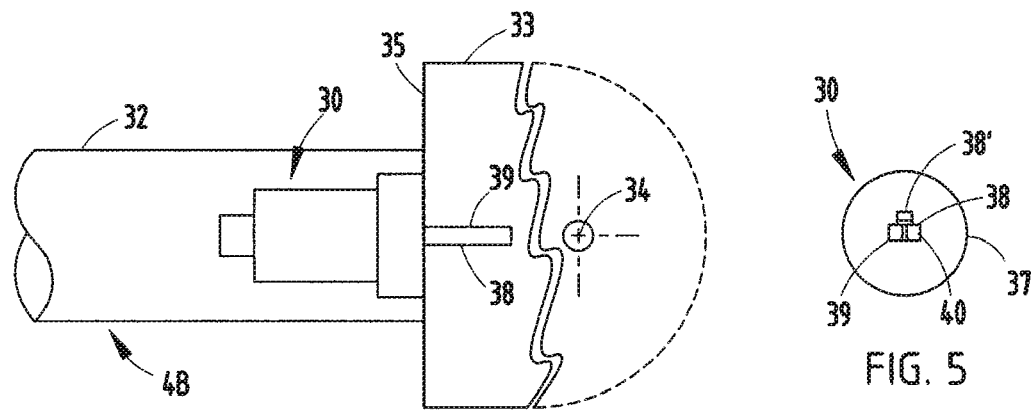
FIG. 4
FIG. 5
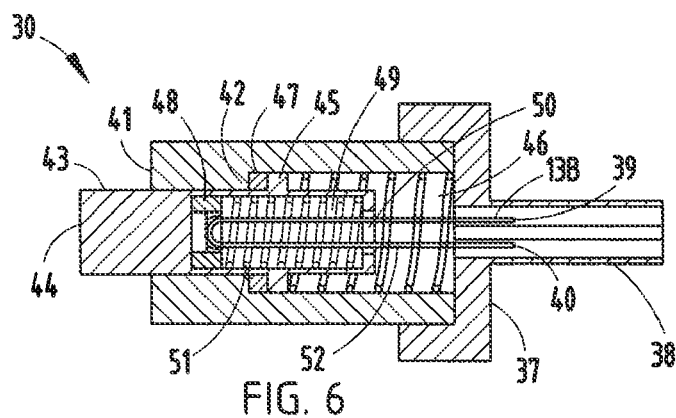
FIG. 6
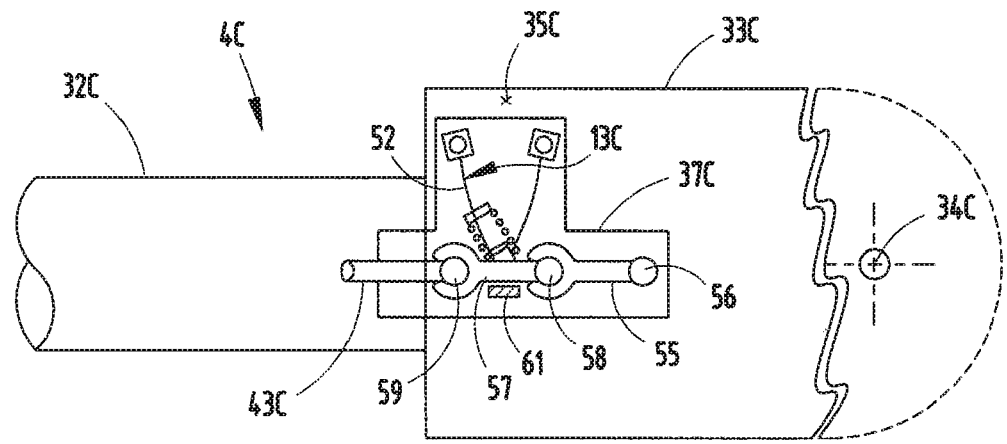
FIG. 7

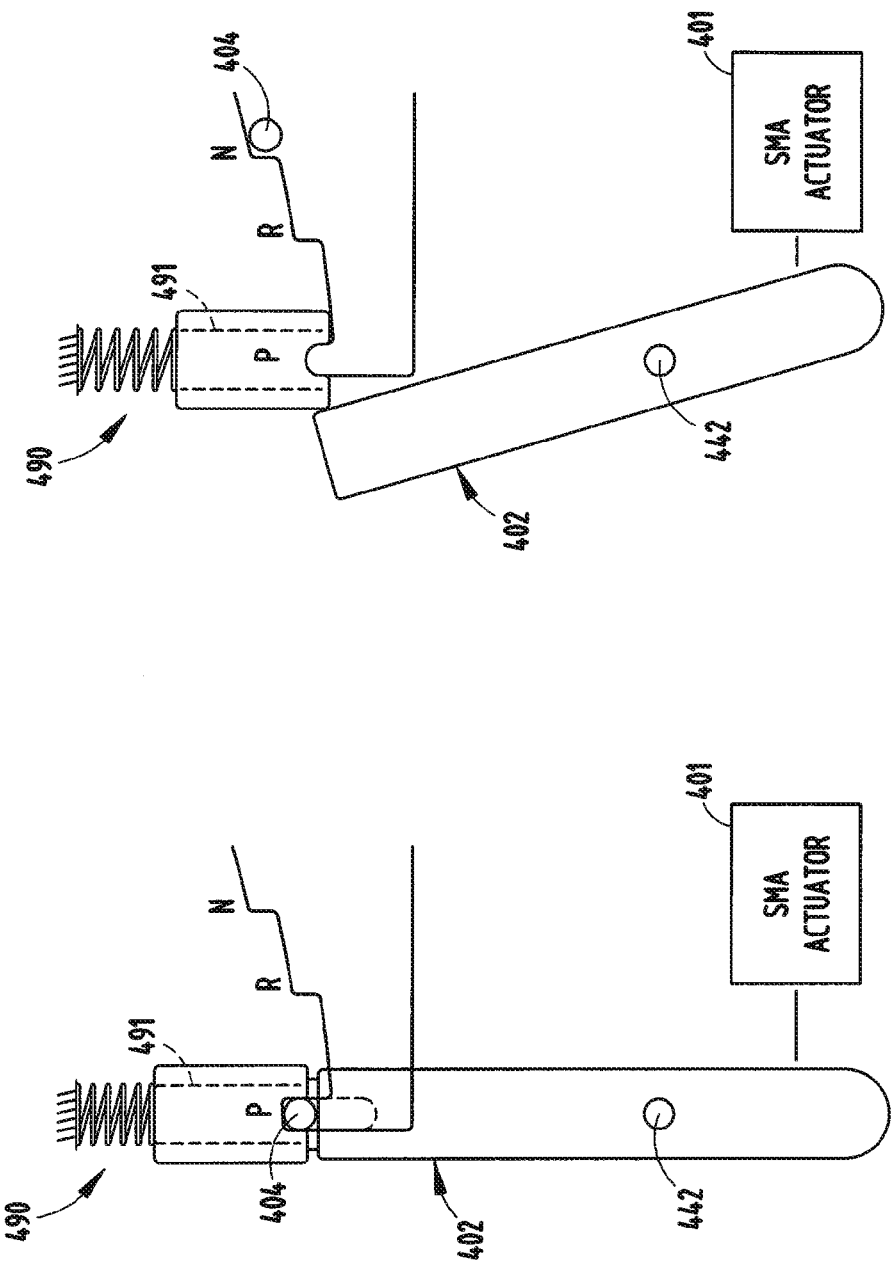

US 8,117,938 B2

SHIFTER WITH SHAPE MEMORY ALLOY AND SAFETY

CROSS-REFERENCE TO RELATED APPLICATIONS

This application is a continuation-in-part of application Ser. No. 11/772,972, filed Jul. 3, 2007, now U.S. Pat. No. 7,814,810 entitled SHIFTER WITH ACTUATOR INCORPORATING SHAPE MEMORY ALLOY, which in turn claims benefit under 35 U.S.C. §119(e) of provisional application Ser. No. 60/818,594, filed Jul. 5, 2006, entitled SHIFTER WITH ACTUATOR INCORPORATING SHAPE MEMORY ALLOY, the entire contents of both of which are incorporated herein in their entirety. Further, this application is related to a utility application Ser. No. 11/772,984, filed on Jul. 3, 2007, entitled SHIFTER WITH ACTUATOR INCORPORATING MAGNETIC UNLOCK MECHANISM, the entire contents of which are incorporated herein in their entirety.

BACKGROUND

The present invention relates to vehicle transmission shifters with actuators incorporating a shape memory alloy wire and/or incorporating a magnetic lock/unlock mechanism to control movement of a shift lever, and more particularly relates to a shifter with shape memory alloy wire actuator and/or magnetic lock/unlock mechanism for controlling movement of a pawl out of a "park" position notch. However, it is contemplated that the present concept is not limited to only vehicle shifters with pawls, nor to only park lock systems, but instead is applicable for any lock/unlock mechanism where a blocking member must be selectively moved with an actuator while occupying a minimum of space and preferably where the actuating mechanism has a minimum of components.

In brake transmission shift interlock mechanisms in automotive shift systems, it is desirable to either block the shift lever itself or block the shift lever's actuating pawl to prevent shifting of the shift lever from the Park position until the ignition key is in the "on" or "run" position and the brake is depressed. However, in an effort to provide these functions, shifters have often become complex, and relatively expensive components are used. Thus, component costs and manufacturing costs have increased significantly. For example, solenoids are often used to control movement of a park lock member that prevents the shifter's pawl from being removed from the Park position. However, solenoids are not inexpensive since they include copper coils and are associated with electromagnetic fields. Further, they require all of the operations associated with coiling insulated copper wire, stripping and terminating coils, electrically connecting the wires to a power source, assembling the solenoid as a preassembled unit, and assembling the solenoid into a shifter. Also, they can create electromagnetic fields and/or voltage spikes that cause disruption to a vehicle's electrical system. For example, some recent shifters incorporate an electrical-actuator-driven pawl onto the shift lever for controlling movement of the shift lever. These actuator-driven pawls typically include a solenoid or electromechanical device operably connected to the pawl member for moving the pawl member into and out of notches representing gear positions. Still further, coils require a significant amount of dimensional space. Recent shifter designs are requiring a reduction in the three-dimensional space occupied by the shifters, and by the shift lock mechanisms. Still further, a force of solenoids varies considerably depending on their temperature. It is desirable to provide a constant force actuator that is not sensitive to temperature.

It is desirable to produce an improved simple, cost-effective electrical actuating device that does not require the complexity of copper coils and associated electromagnetic fields, does not require electromagnetic field collapse energy and associated voltage spikes, and that does not require mechanical processing associated with coiling insulated copper wire, stripping and terminating coils. Further, a smaller design package is desired.

At the same time, pawl-engaging park-lock mechanisms in shifters sometimes require an extra force to initiate movement of the blocking member. This can be caused by a number of different things, such as initial mechanical static friction, by excess friction caused by the vehicle driver pulling on the shifter lever or pawl prior to movement of the blocking member, and other reasons. A compact arrangement is desired that provides an initial high-energy "kick" force to initiate movement of the blocking member, yet that fits within a very small dimensional space, and at the same time that does not result in damage to components when movement of the blocking member is temporarily not possible.

SUMMARY OF THE PRESENT INVENTION

In one aspect of the present invention, an actuator includes a housing, a sliding member slidably engaging the housing, a spring biasing the sliding member in a first direction, and a blocking member operably mechanically connected to the sliding member. A length of shape memory alloy SMA wire is attached to the housing and configured to move the sliding member in a second direction opposite the first direction when current is passed through the SMA wire to change a length of the SMA wire. A control circuit includes at least one switching element that is operably connected to the SMA wire for controlling current flow thereto.

In another aspect of the present invention, a shifter includes a shifter base and notches defining gear shift positions and a park position. A shift lever is pivoted to the base and includes a pawl for engaging the gear shift positions to control movement of the shift lever between at least some gear shift positions and includes a pawl-biasing spring for biasing the pawl toward a home position for engaging one of the notches. An actuator includes a housing, a sliding member slidably mounted to the housing, and a slide-biasing spring biasing the sliding member. A first blocking member has a home position for blocking the pawl in the park position and is movable to a pawl-released position. A length of shape memory alloy SMA wire is attached to the housing and operably engages the sliding member to move the sliding member against the slide-biasing spring when current is passed through the wire. A control circuit controls current flow through the SMA wire. The control circuit includes at least one switching element in communication with the first blocking member so that the switching element operates when the first blocking member is moved from the home position.

In a narrower form, the shifter includes a second blocking member that is provided for holding the first blocking member in the pawl-released position when the pawl is depressed and the shift lever is moved from the park position to another gear position. A second spring biases the second blocking member into a holding position to hold the first blocking member in the pawl-released position until the shift lever is moved back to the park position and until the pawl, biased by the pawl-biasing spring, biases the second blocking member away from the holding position to a rest position where the first blocking member can move back to the home position.

In another aspect of the present invention, an actuator includes a housing. A movable member is positioned therein for movement between a home position and a second position different than the first position, and includes a spring biasing the movable member toward the home position. A length of shape memory alloy SMA wire is attached to the housing and engages the sliding member so that when current passes through the SMA wire and the length changes dimension, the movable member is moved from the home position toward the second position. A switch having first and second operating conditions is located near the movable member and further is configured to be engaged and switched between the operating conditions upon movement of the movable member between the home and second positions.

In another aspect of the present invention, an apparatus includes a shifter base defining gear shift positions including a park position and a shift lever with spring-biased pawl. A blocker is positioned to selectively prevent movement out of the park position by engaging one of the shift lever and the pawl. An actuator includes a shape memory alloy SMA wire for controlling movement of the blocker between a locking position preventing movement out of the park position and a release position permitting movement out of the park position. A control circuit is connected to the actuator and is adapted for connection to vehicle sensors to operate when predetermined vehicle conditions are met, the control circuit including a switch moved from a home position to a second position by moving one of the lever or pawl, the switch being electrically connected to the actuator and also to a vehicle functional component for affecting controlled operation of the actuator and the functional component.

In another aspect of the present invention, an apparatus includes a shifter base defining gear shift positions including a park position and a shift lever with spring-biased pawl. A blocker is positioned to selectively prevent movement out of the park position by engaging one of the shift lever and the pawl. A bell crank engages the blocker. An actuator includes shape memory alloy SMA wire for operating the bell crank to control movement of the blocker between a locking position preventing movement out of the park position and a release position permitting movement out of the park position, and a control circuit for controlling the actuator. A stress relief mechanism on one of the blocker, the bell crank, and the actuator is configured to allow movement of the actuator without corresponding movement of the blocking member to thus avoid damage to the SMA wire.

Methods related to the above are also contemplated to form a part of the present inventive concepts.

An object of the present invention is to provide an improved arrangement for a stress relief mechanism for an apparatus including a shape memory alloy wire actuator for controlling movement of a lever-position-controlling component for in turn controlling movement of a shift lever. For example, the actuator can be operably connected to a pawl on the shift lever, or to an interlock for the pawl, or to an interlock cam for locking the shift lever.

An object of the present invention is to provide an improved control circuit for a shifter where a switch controls current to an actuator comprising a shape memory alloy wire, and further where the switch controls a second functional component such as an ignition key interlock module.

An object of the present invention is to take advantage of metallurgical technologies associated with thermal events to induce motion, commonly referred to collectively as "shape memory alloys."

An object is to claim shape memory alloys in any actuator mechanism, but in particular to shifter gear lock mechanisms, and to shifter park lock/brake transmission shift interlock actuator mechanisms.

Another object is to use a switch in the present shifter mechanism for duplicative purposes, thus reducing the number of components in the system.

Another object is to provide an actuator that is considerably less sensitive to temperature (i.e., the SMA actuator being less sensitive as opposed to solenoids).

These and other aspects, objects, and features of the present invention will be understood and appreciated by those skilled in the art upon studying the following specification, claims, and appended drawings.

BRIEF DESCRIPTION OF DRAWINGS

FIG. 1 is a fragmentary side view of a shifter incorporating a cam lock for locking the shifter's pawl in a park position, and including an actuator for controlling movement of the cam lock, the actuator including a part made of a shape memory alloy (SMA).

FIG. 2 is a fragmentary view showing use of a second biasing arrangement for the cam lock.

FIG. 3 is a fragmentary side view of a modified shifter similar to FIG. 1, but including a mechanical device providing strain relief to the shape memory alloy (SMA).

FIGS. 4-5 are side and end views of a modular pawl assembly.

FIG. 6 is a cross section through FIG. 4, showing details of a housing, a pawl, a main pawl-biasing spring, an actuator member of shape memory alloy, a secondary spring for preventing over-stress on the actuator member, and an electrical connector.

FIG. 7 is a cross section of an assembly similar to that of FIG. 4, but incorporating a toggle linkage into the pawl actuator.

FIGS. 38-38A are side views of a shift lever similar to FIG. 36 but including a mechanical secondary blocker for selectively holding the SMA blocking member in a pawl-released position, FIG. 38 showing the shift lever in its park position and FIG. 38A showing the shift lever moved out of park position and with the mechanical secondary blocker holding the SMA blocking member in its pawl-released position.

DETAILED DESCRIPTION OF PREFERRED EMBODIMENTS

Figure 8:
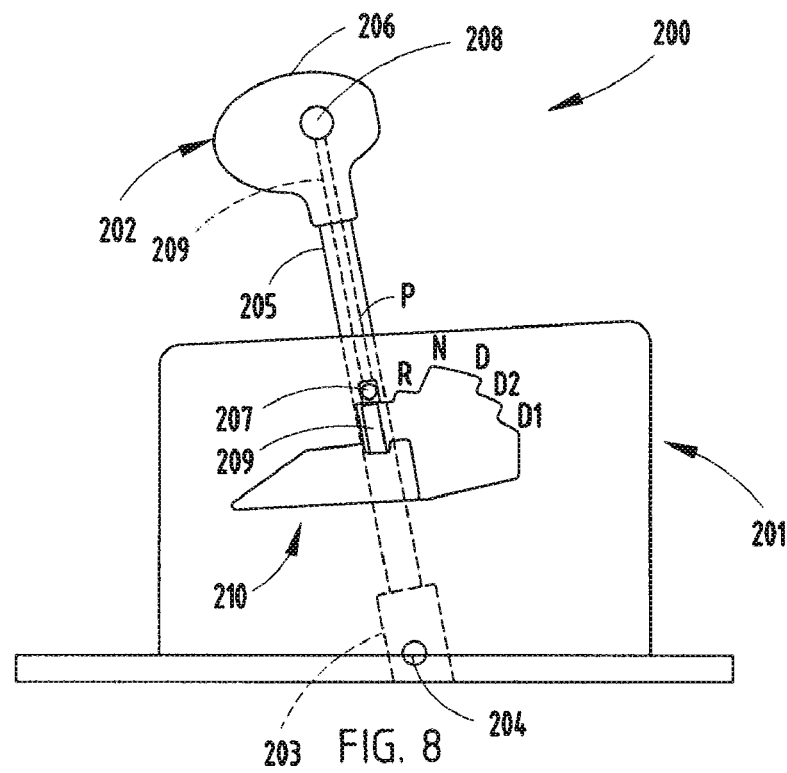
FIG. 8 is a side view of a shifter assembly using a lever-position-controlling component of the present invention.

A shifter 1 (FIG. 1) embodying the present invention includes a pawl member 2 (also called a "blocking member" herein) that engages notches (representing park, reverse, neutral, drive gear positions) in a shift gate 3 to control movement of shift lever 4. A park lock cam 5 is rotatably mounted to a pivot 6, and a spring 7 or the like biases the upper end 8 of cam 5 into stop surface 9 of shift gate 3. When the park lock cam 5 is in the position "A," the upper surface 10 of park lock cam 5 prevents movement of pawl 2 out of park notch 11. Notably, the illustrated spring 7 is a leaf spring, but it is contemplated that it can be another spring, such as the compression spring 7' or torsion spring 7" (FIG. 2) or coil spring 7''' (FIG. 3).

An arm 12 connected to cam 5 extends from pivot 6, and an actuator incorporating a wire 13 made of shape memory alloy (hereafter called "SMA wire 13") is connected to arm 12. Electrical wires 14 and 15 supply electrical current to the SMA wire 13 when the vehicle ignition switch is in the "on" position and the vehicle brake pedal is depressed, thereby contracting the wires 13 and in turn rotating the park lock cam 5 about pivot 6 as indicated by the arrow "B." After the park lock cam 5 has been rotated sufficiently, the cam 5 no longer blocks the pawl 2, such that the pawl 2 can be moved out of the park notch 11, and the shift lever 4 can be moved to a different gear position.

Shape memory alloy wire (SMA wire) is material technology developed that takes advantage of metallurgical thermal events to induce motion. These materials are commonly referred to collectively as "shape memory alloys." SMA wire is available commercially, such as Flexinol® material available from Dynalloy, Inc. (which can be found on the internet). In SMA wire, a controller controls electrical current through the SMA wire to control its temperature, and in turn control material phase change and hence the amount of shrink or extension of the wire.

In shifter 1A and the following shifters, similar numbers are used for identifying similar or identical components, but with the addition of the letter "A" or "B" or "C." This is done to reduce redundant discussion.

The shifter 1A (FIG. 3) is similar to the shifter 1 (FIG. 1), but includes a mechanical strain relief mechanism 20 in order to prevent overstressing and fracturing the SMA component. The relief mechanism 20 allows the SMA wire 13A to contract even when there is frictional pressure on the pawl 2A (i.e., blocking member) such that the pawl 2A itself cannot be retracted. Thus, the relief mechanism 20 is basically a mechanical fuse, preventing the SMA wire 13A from breaking due to overstress. In particular, the illustrated relief mechanism 20 includes a slide connection made of slide pins 22 and mating slots 23 at the terminal end of the actuator. It is contemplated that the relief mechanism 20 will be reset when the pawl 2A is no longer frictionally bound (such as when a vehicle driver stops pulling rearwardly on the shifter when the pawl is still in the park notch 11A). The reset of the relief mechanism 20 can be automatic (such as with a biasing spring or timer) or can be manually performed (such as with a mechanical lever or button). It is contemplated that the blocking member (i.e., cam 5A and/or arm 12A) can be positioned to engage the shift lever directly, instead of acting to engage the pawl.

Further, it is contemplated that the blocking member (i.e., cam 5A) can be positioned on the base, or attached to the shift lever itself to travel with the shift lever during shifting movement, if desired. For example, it is envisioned that the blocking member could be positioned in the handle at a top of the shift lever, to prevent actuation of the thumb button on a shifter handle for mechanically moving the pawl. The use of a thumb button on shifter handles is a design often used in vehicle shifters, such that a person of ordinary skill will understand how to construct this arrangement based on the present disclosure without a detailed explanation. For reference, see FIG. 2 in U.S. Pat. No. 5,494,141 which shows a typical thumb button on a shifter. The blocking member would be positioned, for example, to move vertically upwardly into the cavity within the handle (or into engagement in a pocket in the button itself) in a manner preventing depression/movement of the thumb button until such time as predetermined vehicle conditions are met.

In park lock mechanisms, it is not uncommon for the user to apply an adverse "preventive" load, typically shear, to the blocking member such that the force required to move the blocking member is excessive. For example, a vehicle driver may pull rearward on the shift lever prior to pressing the button for disengaging the shifter's pawl from a notch defining the park position . . . making it more difficult for the vehicle mechanisms to move the pawl out of the park notch. Typical solenoids can accommodate this "increased force requirement" through maintained electromagnetic fields. However, since shape memory alloy actuators are a physical displacement driven by metallurgical thermal phenomenon, prevention of actuation via shear load would yield and ultimately break the SMA wire actuator. This is addressed in the present design of shifter 1A (FIG. 3) by placement of a torsional spring (called a mechanical fuse, or a compensating device) at location 6A which allows the cam 5A to remain stationary and the SMA wire actuator to shorten (i.e., when the SMA wire 13B of the relief mechanism 20 is actuated but when there are frictional forces operating on the cam to prevent its movement). It is also addressed in the present design of pawl module 30 (FIG. 5) by adding a secondary intermediate spring to act as a mechanical fuse (also called a compensating device) such that the actuator will compress the secondary spring while the primary spring remains extended, until such time as the preventive load is removed from the blocking member. When the load is removed from the blocking member, the secondary spring will expand, causing the primary spring to compress against the force of the actuator, and causing the blocking member to retract, as discussed below in more detail.

A pawl module 30 (FIGS. 4-6) incorporates a shape memory alloy (SMA) wire 13B and is attachable to a shift lever 4B as follows. The shift lever 4B includes a shift post 32 with molded-on pivot member 33 defining a pivot axis 34 and a platform 35. The pawl module 30 includes a tubular base 37 having a protruding connector 38 with a barb 38' for mechanically frictionally engaging a mating socket in the platform 35 and a pair of electrical contacts 39 and 40 for electrically connecting to wiring in the platform 35, the wiring being operably connected to a shift control processor in the vehicle. Pawl housing 41 is supported on base 37 and includes a top opening defined by inwardly directed flange 42. A pawl 43 (also called a "blocking member") includes a tip 44 that protrudes through the opening and is configured to engage notches that define gear positions of the shifter. The pawl 43 further includes an annular ring 45 that abuts an inner surface of the flange 42. A main spring 46 engages the ring 45 and biases the pawl 43 to an extended position. A resilient ring dampener 47 dampens extension of the pawl 43 as the annular ring 45 approaches the flange 42, thus preventing a clicking noise. A portion of the pawl 43 is hollow and defines a cavity 49 and an opening 50 into the cavity 49 at the connector end of the pawl 43. A sliding pilot member 48 is positioned within the cavity 49 at an opposite end of the cavity 49, and is biased toward the opposite end by a secondary spring 51. The secondary spring 51 has one end abutting the pilot member 48 and the other end abutting the inward flange forming the opening 50 at the connector end of the module 30. The SMA wire 13B forms a loop 52 that extends from the electrical contacts 39 and 40 through the opening 50 and longitudinally through the cavity 49 and then loops over a transverse pin 53 in the pilot member 48.

When electrical current is passed through the SMA wire 13B, it is heated and contracts, pulling the sliding pilot member 48. As the pilot member 48 is pulled, the pilot member 48 moves toward the secondary spring 51 and the secondary spring 51 causes the pawl 43 to retract. When the pawl 43 retracts, the main spring 46 is compressed.

If the pawl 43 is frictionally bound and unable to move (such as if a vehicle driver is pulling rearwardly on the shift lever prior to actuation of the SMA wire 13B), the SMA wire 13B still contracts, and the pilot member 48 still moves toward the secondary spring 51. However, since the pawl 43 is frictionally bound and unable to move, it is the secondary spring 51 that compresses (i.e., the pilot member 48 moves toward the end forming the opening 50) . . . while the main spring 46 remains temporarily in a static condition. Once the pawl 43 is released from being frictionally bound, the secondary spring 51 decompresses, the pilot member 48 moves to its home position, and the pawl 43 retracts as the main spring 46 compresses. Notably, the secondary spring 51 is slightly stronger than the main spring 46 so that if the pawl 43 is free to move, it is the main spring 46 that compresses and the secondary spring 51 does not compress.

It is contemplated that the housing for the SMA actuator can be attached to the base or to the shift lever. A shifter having a detent-forming component attached to a base and also a shifter having a molded-on pivot member can be found in existing patents, such as Osborn U.S. Pat. No. 5,277,077, the entire contents of which are incorporated herein in their entirety. It is contemplated that the housing for the SMA actuator can be incorporated into either of these molded components, or attached as a separate component to either the base or the shift lever.

A second pawl module 30C (FIG. 7) incorporates a shape memory alloy (SMA) wire 13C and is attachable to a shift lever 4C as follows. The shift lever 4C includes a shift post 32C with molded-on pivot member 33C defining a pivot axis 34C and a platform 35C. The pawl module 30C includes a base 37C attached to the pivot member 33C. A pawl 43C is attached to a toggle linkage comprising a first link 55 pivotally anchored at a stationary pivot 56, and a second link 57 pivoted to first link 55 at pivot 58 and to a trailing end of the pawl 43C at pivot 59. The SMA wire 13C includes a loop 52C that extends around a transverse pin 53C and two legs that extend to electrical contacts 39C and 40C. A bias spring 60 biases the links 55 and 56 to an aligned position where the pawl 43C is extended. When current passes through the SMA wire 13C, the wire 13C contracts and pulls the links 55 and 56 out of alignment. This causes the pawl 43C to retract. It is noted that the arrangement pulls the pawl 43C with considerable mechanical advantage at the initial stage of movement. This can be very desirable, which is why the toggle system has had significant success in the marketplace. The present arrangement gives the SMA wire 13C this same advantage. When current through the SMA wire 13C is stopped, the spring 60 biases the toggle links 55 and 57 back to an aligned position, thus locking the pawl 43C in a home position. Notably, the links 55 and 57 pass slightly over center, such that a high force cannot overcome the locked condition. A stop 61 holds the links 55 and 57 at their locked positions and prevents them from moving "too far" over center. In a toggle-type assembly, a pre-load release mechanism is achieved through toggle links and through mechanical advantage. The SMA actuator both simplifies the actuator mechanism by reducing size and complexity. The toggle-type mechanism has very low load and travel requirements to collapse the toggle, which is ideally suited to SMA wire. In this arrangement, the need for a mechanical fuse is eliminated as the fuse is integral to the toggle assembly.

For additional information on a park lock system using a toggle linkage, see Osborn U.S. Pat. No. 5,494,141, and for additional information on a pawl actuated system using a toggle linkage see Osborn U.S. Pat. No. 5,775,166. It is contemplated that the present SMA system can be incorporated into either of these shifter systems. The disclosure of both of these two patents is hereby incorporated by reference in their entirety for their teachings.

It is important that sound and noise be minimized in vehicle interiors. In SMA actuators, since this is a metallurgical thermal phenomenon, it is desirable to manipulate the temperature so as to control the rate at which the phase transformation takes place. By carefully controlling the rise or drop in temperature, the present system can eliminate the need for many dampeners and can eliminate undesirable noise. This saves cost by eliminating the need for various means by which mechanical oscillations and impacts are dampened, such as by the addition of cushions and bumpers. Electronics allows dampening through current manipulation. Notably, the motion created as the SMA wire cools is relatively slow and "inherently" dampened, while the motion created as the SMA wire is heated from current flow can be much quicker, depending on the current flow.

It is contemplated that a scope of the present invention includes using the SMA wire in any application where a solenoid could be used, but where there is a desire to reduce complexity of components, and/or avoid electromagnetic fields, and/or avoid a component with the expense and size of a solenoid, and/or to avoid a clicking noise of an actuator or solenoid.

In the following discussion, new identification numbers are used to help provide a clear description, and to avoid confusion. However, it is contemplated that the features, characteristics, and functions of using the SMA wire in an actuator are also present in the structure described in this additional disclosure.

A shifter assembly 200 (FIG. 8) includes a molded base 201 for attachment to a vehicle (such as to a vehicle floor between front vehicle seats) and a shift lever 202 pivoted to the base 201. The illustrated base 201 is a polymeric molding, but it is contemplated that various bases can be used. The shift lever 202 includes a molded bottom 203 pivotally supported by a pivot pin 204 on the base 201, and further includes a tubular shaft 205 extending from the molded bottom 203, a hand grip 206 on the shaft 205, a pawl 207 for selectively engaging gear position notches (P park, R reverse, N neutral, D drive, etc.) in the base 201, a button 208 on the hand grip 206 for motivating an internal telescopingly-sliding straw 209' in the tubular shaft 205 to move the pawl 207 vertically. It is contemplated that the present inventive concepts can be incorporated into a wide variety of different shifter designs.

Figure 9:
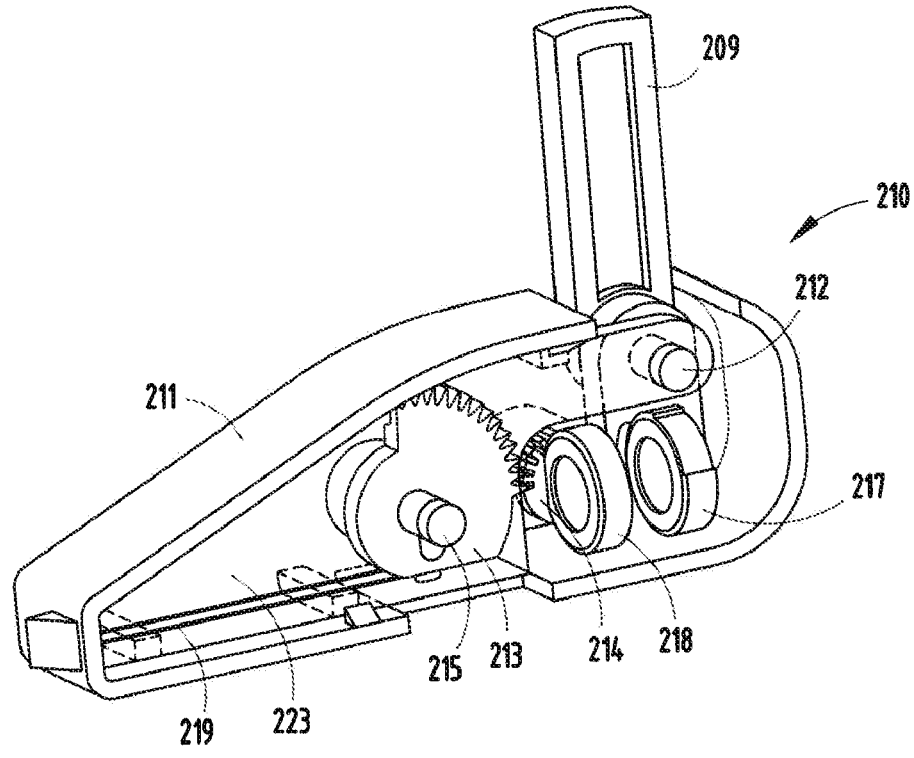
FIG. 9 is a perspective view of the lever-position-controlling component of FIG. 8, a side of the component being shown open to better reveal parts therein.
Figure 12:
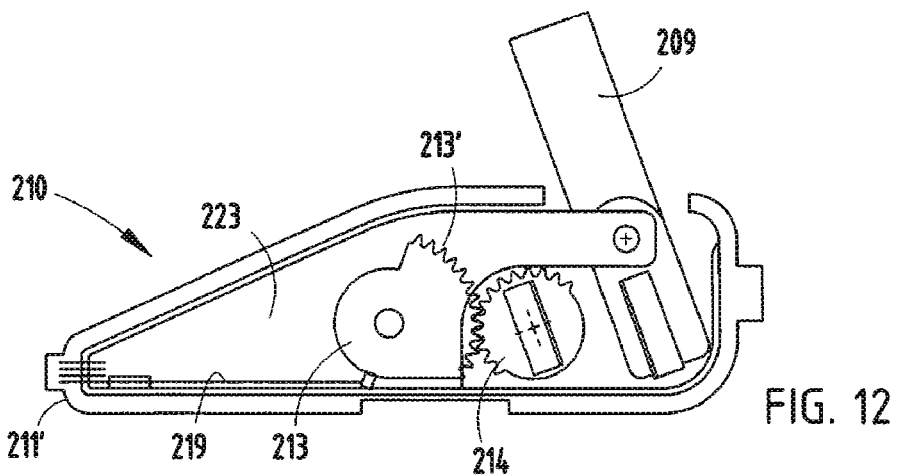
Figure 13:
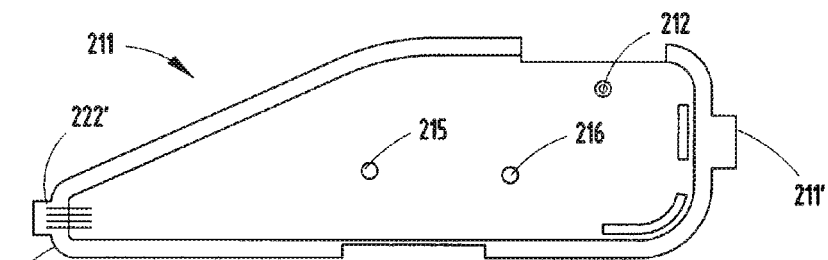
FIGS. 13-18 are side views of the housing, drive gear, driven gear, locking member, shape memory alloy wire, and circuit board, respectively, in FIG. 9.
Figure 14:
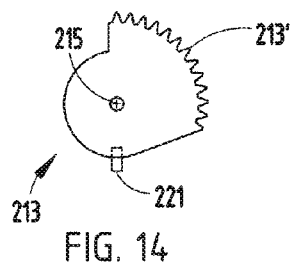
Figure 15:
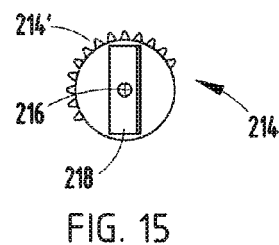
Figure 16:
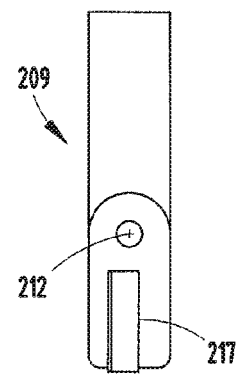
Figures 17, 18:
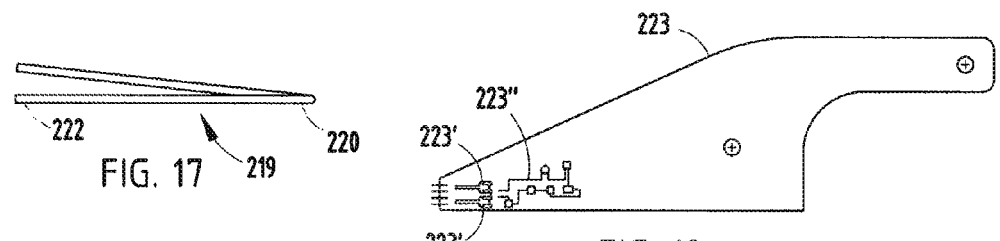
Figure 19:
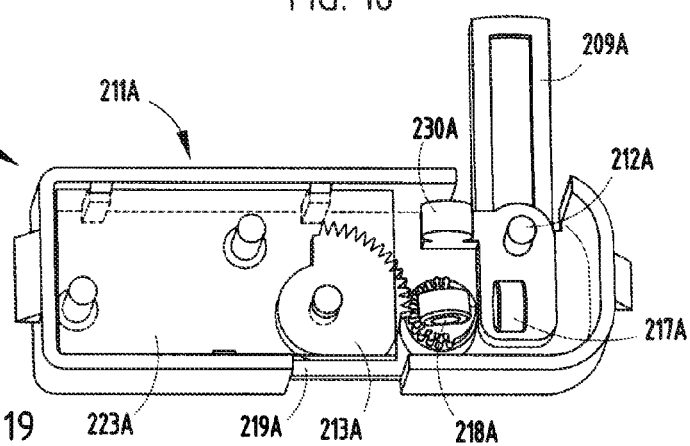
FIGS. 19-26 are side schematic views of modified lever-position-controlling components.

The illustrated lever-position-controlling component in FIG. 8 (and see FIGS. 9-10) is a pivoting blocking member 209 attached to the base 201 as part of a subassembly 210. The blocking member 209 is shown in a vertical (locking) position under the pawl 207 (FIGS. 8-10), locking the pawl 207 in the Park notch P, such that the shift lever 202 cannot be moved from the park position. The blocking member 209 is movable to a pivoted position (see FIG. 12) where it does not block vertical movement of the pawl 207 . . . thus allowing the vehicle driver to press the button 208 and cause the pawl 207 to move out of the park notch P . . . thus allowing the driver to shift the shift lever 202 between gear positions (P, R, N, D, etc.).

The subassembly 210 (FIGS. 10 and 13-18) includes a housing 211 configured for secure attachment to the base 201, such as by attachment tabs 211'. The blocking member 209 is pivoted to the housing 211 at location 212. Gears 213 and 214 include intermeshing teeth 213' and 214', respectively, that form a drive assembly, and are pivoted at locations 215 and 216 to the housing 211. First and second permanent magnets 217 and 218 are attached to the blocking member 209 and gear 214. The magnets 217 and 218 are preferably permanent magnets, such as rare earth magnets selected from neodymium type magnets or samarium cobalt type magnets. A shape memory alloy wire 219 is positioned along a bottom of the housing 211, and includes a loop end 220 that engages a protrusion 221 on the gear 213 and a contact end 222 that engages electrical contacts 222' at one end of the housing 211.

A circuit board 223 includes clamp connectors 223' for electrically and mechanically connecting to ends of the SMA wire. Additional connectors are provided on the circuit board for connecting to vehicle electrical power and to the control circuit 223" on the board. The circuit board 223 is positioned in the housing 211. A separate cover (not shown) can be used to cover the open side of the subassembly 210, or alternatively, the open side can be placed against a side wall of the shifter base 201. The circuit board 223 includes as many components as desired for control of the electrical current and timing thereof to the SMA wire 219. Typically, a processor will be included that is programmed to detect that the vehicle ignition switch is "on" and that the vehicle brake pedal is depressed, with these preconditions existing prior to current being applied to the SMA wire 219 to release the pawl 207 from the park position "P." The wire 219 and circuit board 223 form an actuator for operating the gears 213, 214 to move blocking member 209.

Figure 10:
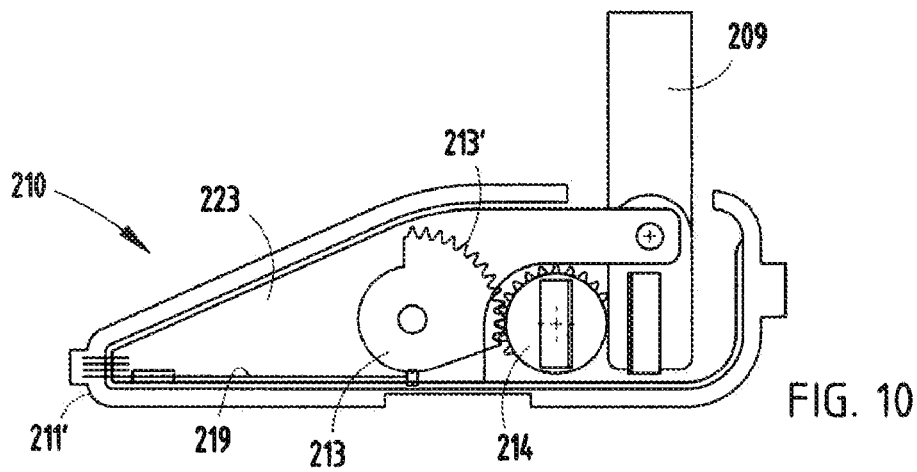
FIGS. 10-12 are side views of the lever-position-controlling component of FIG. 8, FIG. 10 showing the component in a locking position, FIG. 11 showing the component in a dynamic actuated position, and FIG. 12 showing the component in an unlocked release position.
Figure 11:
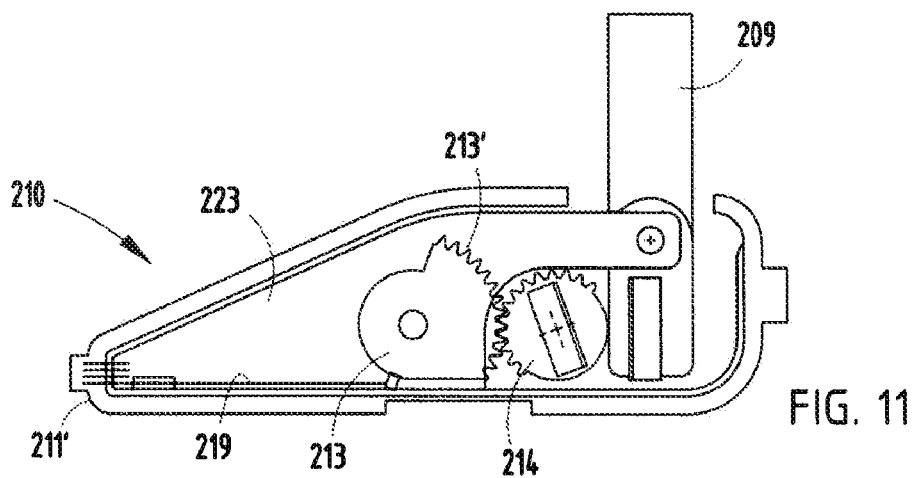

Specifically, the wire 219 changes length as electrical current is applied to the wire 219, causing the gears 213, 214 to rotate. The magnets 217, 218 are positioned in magnetic communication in a stable first position when the SMA wire is de-energized, thus holding the blocking member 209 in its locked blocking position (FIG. 10). When the wire 219 is energized and the gears 213, 214 are rotated about 20 to 30 degrees, the magnet 217 moves (see FIG. 11) to a position where magnet forces create a very unstable repelling condition with the magnet 218. As a result, the blocking member 209 is motivated to move to its release (unlocked) position (FIG. 12) with substantial magnetic repulsive forces. This is accomplished with relatively small movement of the magnets 217, 218 and with a low force to move the magnets 217, 218 . . . yet the force of repulsion is quite large and the three-dimensional space taken up by the design is surprisingly small and very compact.

Notably, the magnet arrangement offers several advantages. The magnet arrangement is generally not sensitive to thermal conditions often seen in vehicle passenger compartments such as hot and cold, and is generally not sensitive to electrical spikes and/or power loss often seen in vehicle electrical systems. Also, the magnet arrangement does not emit electromagnetic interference and there is no flyback energy from breakdown of the electromagnetic fields that is associated with common solenoids. Also, the blocking force is independent of the input voltage, and therefore it is generally much more stable than electromagnets through the working range of most electrical systems. Still further, since the working force is mechanically decoupled, the actuator can be sealed from debris and is also less susceptible to liquid spill through its non-contact design. This also enables mechanical override flexibility and eliminates the need for strain relief when used in combination with SMA wire. The magnet arrangement has very low load and travel requirements, which makes it ideally suited for use with SMA wire. As noted above, the present arrangement eliminates the need for a mechanical fuse since the "fuse" function is integral to the magnet arrangement. Specifically, this design uses magnetic communication, and there is no mechanical coupling to the blocker mechanism. This makes a manual override for the blocker mechanism simple. It also provides strain relief when the blocker member is bound mechanically, such as by tension from the vehicle driver pulling/pushing on the pawl or shift lever.

The subassembly 210 is attached to the base 201 in a manner allowing it to control movement of the pawl 207 (by preventing the pawl 207 from moving out of the park notch until a brake pedal is depressed and the vehicle ignition is "on"). However, it is contemplated that the present subassembly 210 can be attached to the base 201 to abuttingly engage and prevent movement of the shift lever 202 (such as by holding the shift lever 202 in a forward position equivalent to the park notch position). Alternatively, the present subassembly 210 can be attached to a linkage for controlling movement of the pawl 207 (see FIG. 7). Notably, the present invention is not limited to use in a vehicle transmission shifter, but instead it is contemplated that the present inventive concepts can be used in any environment where the high magnetic forces generated by permanent magnets allow a very compact design yet that provide a good "kick" when initiating movement of a blocking member. For example, similar mechanisms are sometimes used on hotel door locks with magnetic access cards, where an initial high-force "kick" is required to initiate movement of the lock's deadbolt toward an unlocked position.

FIGS. 19-33 are schematic drawings showing modified shifters with modified lever-position-controlling components. In FIGS. 19-33, similar and identical components, features, and characteristics are identified using a same number, but with the addition of a letter "A," "B," "C," etc. This is done to reduce redundant discussion.

The subassembly 210A (FIG. 19) uses three magnets 217A, 218A and 230A, with the first and second magnets 217A and 218A (upon rotation of the gears 213A and 214A) providing a force to cause the blocking member 209A to move from the locking position to the unlocking position, and with the first and third magnets 217A and 230A helping maintain that position. As the gears 213A and 214A are re-rotated toward their home position, the first and third magnets 217A and 230A (previously positioned to attract each other) begin to repel each other (as the magnets are moved about 20 to 30 degrees), and soon the first and second magnets 217A and 218A are positioned to attract each other and hence help hold the locking position of the blocking member 209A.

Figure 20:
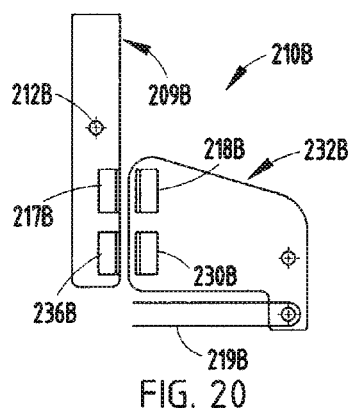
Figure 21:
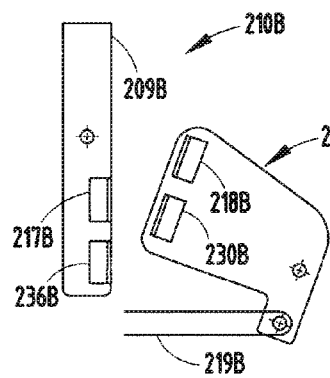
Figure 22:
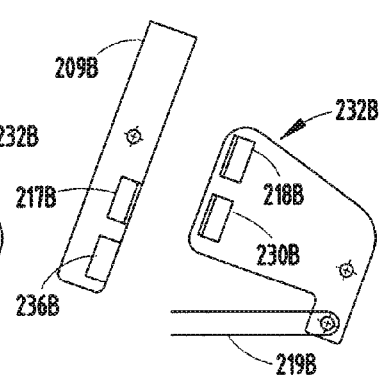
Figure 23:
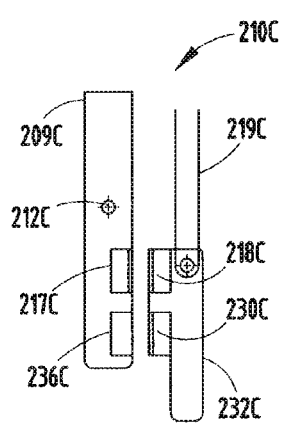
Figure 24:
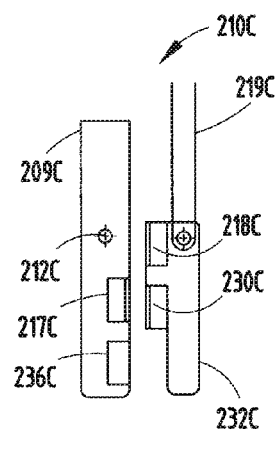
Figure 25:
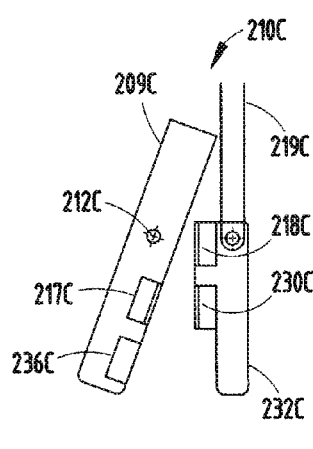
Figure 26:
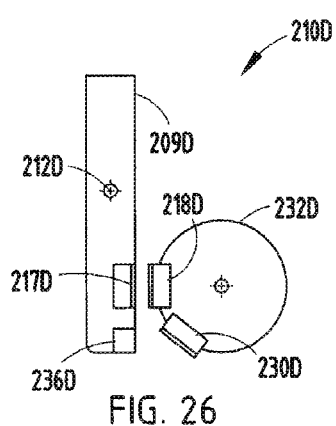

FIGS. 20-22 show a configuration similar to subassembly 210A, except the subassembly 210B in FIGS. 20-22 includes a carrier cam 232B carrying the magnets 218B and 230B. The loop end 220B of the SMA wire 219B acts directly on a leg of the cam 232B to move the magnets 218B and 230B between a locked first position where the magnets 217B and 218B attract, and an unlocked second position where the magnets 217B and 230B attract. Notably, the magnets 217B, 218B and 230B combine to create unstable repelling condition when the blocking member 209B is "halfway" between the first and second positions, which helps avoid the blocking member 209B from staying in a partial "halfway" position. A hall effect sensor 236B is positioned on the cam 232B in a position where it passes near the magnets 218B and 230B, such that it can sense the cam's position based on a position of the magnets 218B and 230B.

The subassembly 230C (FIGS. 23-25) replaces the carrier cam 232B with a linearly sliding carrier member 232B connected to the SMA wire 219C. The subassembly 230D (FIG. 26) replaces the cam with a rotating carrier wheel 232C connected to the SMA wire 219D.

Figure 27:
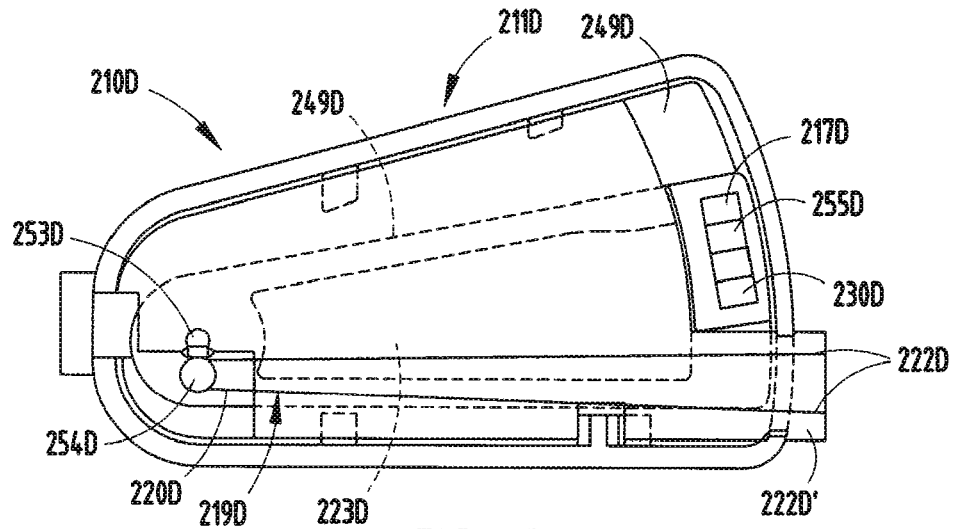
FIG. 27 is a side view of another modified subassembly for controlling shift lever position.
Figure 28:
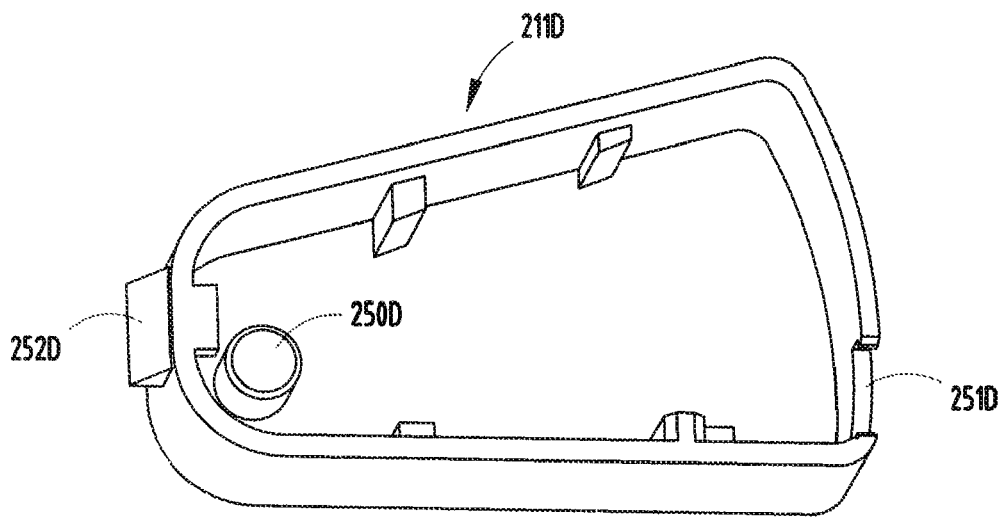
FIGS. 28-29 are perspective views of the housing and blocking member shown in FIG. 27.
Figure 29:
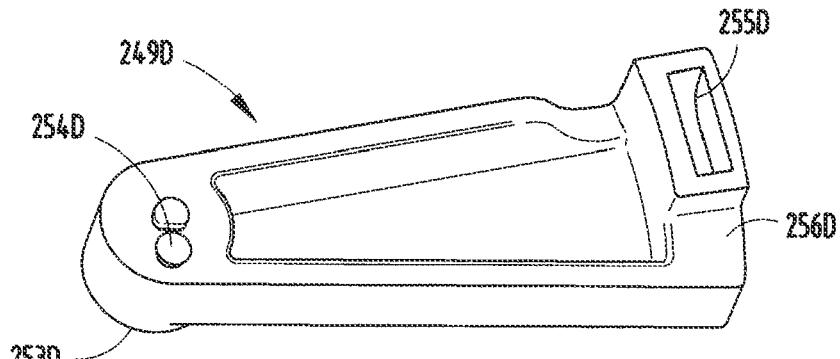
Figure 30:
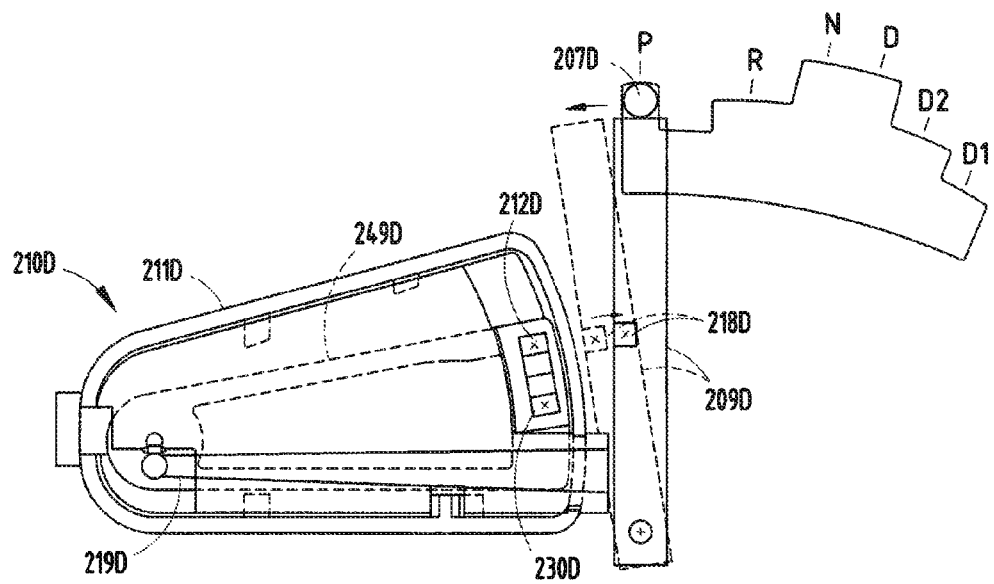
FIGS. 30-31 are side views of the modified subassembly of FIG. 27 incorporated into a shifter, FIG. 30 showing the shift lever's pawl locked in a park position, and FIG. 31 showing the pawl unlocked so that the shift lever is movable to different gear positions.

FIG. 27 is a side view of another modified shift-lever-position-controlling subassembly 210D for controlling the position of a shift lever. The subassembly 210D includes a housing 211D (FIG. 28) with a recessed area including an integral pivot boss 250D at one end and a location 251D for receiving an electrical connector at the other end. Also, the housing 211D includes attachment tabs 252D (or attachment flanges, etc.) to facilitate connection to a shifter base. A drive member 249D (FIG. 29) includes a pivot socket 253D at one end for rotatably engaging the pivot boss 250D, a stud 254D adjacent the pivot socket 253D, and includes a second end with a configured section having a recess 255D and a cutaway 256D. The SMA wire 219D (FIG. 27) includes a loop end 220D that wraps around the stud 254D and includes contact ends 222D that extend to the cutaway 256D, where they connect with electrical contacts 222D' on the circuit board 223D. The cutaway 256D provides space for the SMA wire 219D when the blocking member 209D is pivoted within the housing 211D (due to actuation of the SMA wire 219D). First and second magnets 217D and 230D are positioned in the recess 255D, and a third magnet 218D is positioned on a blocking member 209D (FIG. 30). The blocking member 209D is pivoted to a shifter base at location 248D. The blocking member 209D can be spring biased to a normal pawl-blocking position if desired. The pawl 207D is movable between park position P, reverse gear position R, neutral gear position N, drive position D, second gear position D2, and first gear position D1. It is contemplated that the present inventive concepts can also be used on shifters with alternative gear positions and gear sequences.

Figure 31:
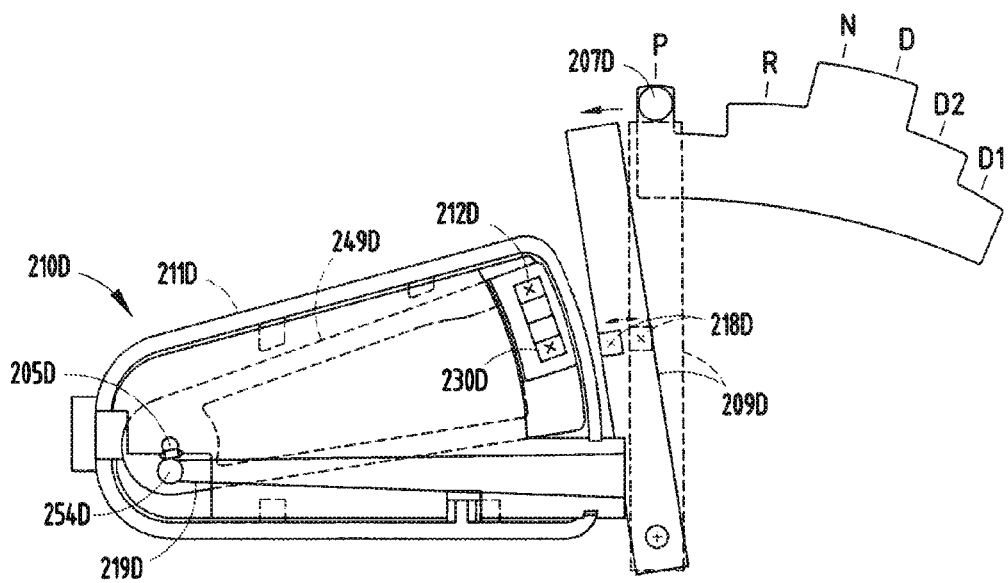

FIGS. 30-31 are side views of a shifter incorporating the modified subassembly 210D of FIG. 27 incorporated into a shifter. FIG. 30 shows the shift lever's pawl 207D locked in a park position P, and FIG. 31 shows the blocking member 209D moved to an unlocked/release position so that the pawl 207D is unlocked so that the shift lever is movable to different gear positions. In FIG. 30, the magnets 217D and 230D magnetically repel, holding the blocking member 209D in a stable pawl-locking position where movement of the shift lever is controlled (i.e., the shift lever is locked/held in its park position P). In FIG. 30, the SMA wire 219D is not actuated (i.e., electrical current is not flowing through the wire). In FIG. 31, the circuit board 223D senses from vehicle mounted sensors (i.e., a brake switch, and an ignition switch) that the vehicle's brake pad is depressed and that its ignition switch is turned on. Thus, the circuit on the circuit board 223D passes electrical current through the SMA wire 219D, causing a phase change that shortens the wire 219D. This in turn causes the drive member 249D to rotate, moving the magnet 217D away from the magnet 230D and moving the magnet 218D close to the magnet 230D. The magnet 218D is positioned with a reverse polarity compared to magnet 217D. Thus, as the magnet 217D moves away, the magnetic repelling forces between magnets 217D and 230D is lost. As the magnet 218D is moved close to magnet 230D, there is a strong magnetic attraction. This pulls the blocking member 209D away from the pawl-locking position (FIG. 30) and drives it toward an unlocked/release position (FIG. 31). A spring can be used to bias the blocking member 209D to a preferred home position.

It is contemplated that a modified subassembly can be constructed similar to FIG. 27 and incorporated into a shifter with a modified blocking member, where the magnetic polarity of the magnet is reversed from the magnet 218D in FIG. 27. (In other words, the replacement magnets (217D and 218D) would attract to hold the blocking member (209D) in a pawl-blocked shift-lever-locked park position, . . . and the magnets (218D and 230D) would repel when positioned in front of each other.) Nonetheless, the function and operation is very similar to that shown in FIGS. 30-31. In particular, the modified blocking member (209D) would be pivoted at a pivot point (see 260D) located between a magnet (230D) on its lower end and its pawl-engaging upper end (see 262D). The blocking member (209D) would be held in a park locking position by attraction of magnets (217D and 218D) such that the shift lever's pawl is locked in the park position. The blocking member (209D) would be held in an unlocked pawl-releasing position by repulsion of magnets (217D and 230D), so that the shift lever is movable to different gear positions.

Modification

Figure 37:
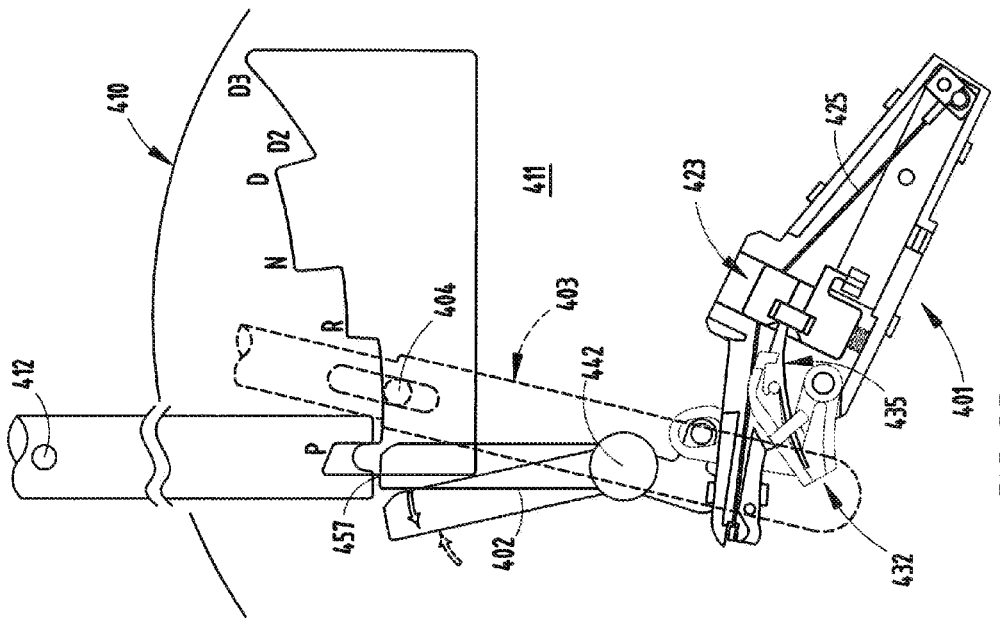
FIG. 37 is a side view of FIG. 36 but where the shift lever is moved out of its park position.

A shifter 400 (FIGS. 32-36) incorporates a shape memory alloy (SMA) actuator 401 to control movement of a blocker 402 to selectively prevent moving a shift lever 403 (or pawl 404) out of its park position P until predetermined vehicle conditions are met. A mechanical fuse (i.e., flexible overload spring 434, also called a "strain relief mechanism") prevents damage to the SMA actuator 401 when the shift lever 403 (or pawl 404, see FIG. 37) is frictionally stopped from movement despite the contraction of the SMA actuator 401. The control circuit 406 (see FIG. 32 and also SMA sub-circuits 460 and 471 in FIGS. 39 and 40) for the SMA actuator 401 includes a photo-electric switch 407 with switching element (preferably a "photo-interrupter" switch or could potentially be a light-sensing optic switch) for stopping electrical power to the SMA actuator 401 when the shift lever 403 is moved from its park position P. The shift lever 403 includes structure for mechanically continuing to hold the switch 407 open (i.e., where electrical power to the SMA actuator 401 is stopped) when the shift lever 403 is out of park P and in another gear position. Further, the circuit 406 is operably connected to an ignition key retaining mechanism 408 so that the ignition key 409 cannot be removed when the shift lever 403 is not in its park position.

It is contemplated that the present concepts can be used on a number of different shifter designs known in the art. The illustrated shifter 400 (FIG. 33) includes a base 410 attached to a vehicle floor or console with side walls 411 defining a pivot 412 for the shift lever 403, and further include side aperture(s) (also called "windows") with undulations or notches defining transmission gear positions park P, reverse R, neutral N, drive D, second gear D2, and low gear L selectively engaged by the pawl 404 for controlling shifting of the shift lever 403. A feel positioner includes a roller or slide operably supported by a resilient leaf spring that rollingly engages an undulated surface on the shift lever, for providing a feel for gear positions. Feel positioners are generally well known in the art of transmission shifters.

The SMA actuator 401 (FIG. 32A) includes a base 418 (also called a "housing") attached to one of the side walls 411. A circuit board 419 is attached to the base 418 in a protected area. (The base 418 includes perimeter walls 420 defining a covered container for the circuit board 419 when the base 418 is attached to the side wall 411, or alternatively, a cover 420' is used as shown in FIG. 32B.) Flanges 421 (FIG. 32A) on the base 418 define a linear track 422, to which a slide member 423 (also called "sliding member" or "slide") is slidably mounted. (However, it is contemplated that the slide member could be constructed to move along an arcuate path, or to pivot or move rotationally.) A slider-biasing spring 423' biases the slide member 423 to a normally raised home position. An arm 424 on the slide member 423 includes a downwardly-extending light blocking end positioned above the photo-electric switch 407 when the slide member 423 is in the raised home position (FIG. 32), but that is positioned inside the switch 407 to block light in the photo-electric switch 407 to thus open the switch 407 (i.e., stop flow of electrical power) when the slide member 423 is moved to an actuated position (FIG. 33).

The SMA actuator 401 (FIG. 32A) includes an SMA wire 425 extending from a first electrical connector 426 at one end of the base 418 across a curved top 428 of the slide member 423 to an anchor 429 at an opposite end of the base 418, around the anchor 429, back across the curved top 428 of the slide member 423 and to the second electrical connector 430. When electrical current flows through the SMA wire 425, the SMA wire 425 heats and concurrently shortens, causing a length of the wire 425 to decrease. For example, the vehicle's control circuit 406 (FIG. 32) causes electrical current to flow through the SMA wire 425 when predetermined vehicle conditions are met, such as when the brake pedal 450 is depressed and the brake pedal switch 451 is closed. (i.e., In modern vehicles, the brake pedal 450 must be depressed in order to move the shift lever 403 out of its park position P.) The ends of the wire 425 (i.e., connectors 426/430 and anchor 429) are fixed, such that as the wire 425 decreases in length, it is forced to a less-bowed shape, which forces the slide member 423 to slide from its raised home position (FIG. 32) toward its lowered actuated position (FIG. 33) against the bias of the spring 423'. When the slide member 423 moves to its actuated position, the light blocking end of the arm 424 blocks infrared light in the switch 407 thus opening the switch 407. This information is communicated back through the control circuit 406 to control other functions, such as the key interlock module 408, discussed below.

The SMA actuator 401 (FIG. 32A) further includes a bell crank 432 (which incorporates a "stress relief mechanism" which incorporates a resilient spring arm/resilient follower 435 to reduce stress when components are bound and cannot move. The bell crank 432 is mounted on a pivot stud 433 in the housing base 418. The mechanical fuse 434 is the form of an elongated resilient polymeric leaf-spring-like follower 435 mounted to the bell crank 432 and includes an end 436 that slidably engages a transverse channel 436' in the slide member 423. When the slide member 423 moves from its raised home position (FIG. 32) to its actuated position (FIG. 33), the follower 435 slides along the transverse channel 436' to a minimum stress position but also normally causes the bell crank 432 to rotate (in a clockwise direction in the FIG. 32). Notably, if the bell crank 432 is prevented from rotation (such as if the shift lever 403 is biased by a vehicle driver against the blocking member 402 with such force that the blocking member 402 cannot be moved out of its blocking position) (see FIG. 35), then the follower 435 flexes in a manner allowing the slide member 423 to move, yet allows the bell crank 432 to NOT move until such time as the blocking member 402 can move. Thus, the follower 435 is sufficiently flexible to prevent damage to the SMA wire 425 even when the SMA wire 425 is heated but when the bell crank 432 cannot rotate (i.e., blocking member 402 cannot be moved to an unblocking lever-released position).

The SMA actuator 401 (FIG. 32A) further includes an arm 440 with a slot 441 to which the blocking member 402 is operably connected. Specifically, the blocking member 402 is elongated and includes a center pivot 442, a first end 443 with a protrusion 444 engaging the slot 441, and an opposite second end 445 positioned to abut a side of the shift lever 403 when the blocking member 402 is in its blocking position (FIG. 32) where the shift lever 403 is held in its park position P. When the bell crank 432 is rotated (clockwise in FIG. 33), the protrusion 444 slides along the slot 441, causing the blocking member 402 to pivot on its pivot 442, such that the lever-abutting second end 445 moves away from a lower end of the shift lever 403. In this position, the shift lever 403 is permitted to move out of the park position P (along a direction to the right in FIG. 33). (i.e., The driver must depress the pawl 404, but in FIG. 33 the lever 403 is not otherwise blocked from movement to another gear position.)

When the shift lever 403 is moved out of the park position P (FIG. 34), a bell-crank-abutting surface 455 on the shift lever 403 abuts a top surface 456 on the leg 445 of the blocking member 402, which causes the components 402, 432, and 423 to remain in their lever-released positions (i.e., against the bias of spring 423'). Thus, the switch 407 is mechanically kept open due to a position of the light-blocking arm 424 in the light switch 407 held open as long as the shift lever 403 is not in its park position P. Notably, there is an angled surface 457 at an end of the top surface 456 on the blocking member 402 that helps provide smooth engagement and/or disengagement from the shift lever 403 as the shift lever 403 is moved back to the park position P.

Figure 36:
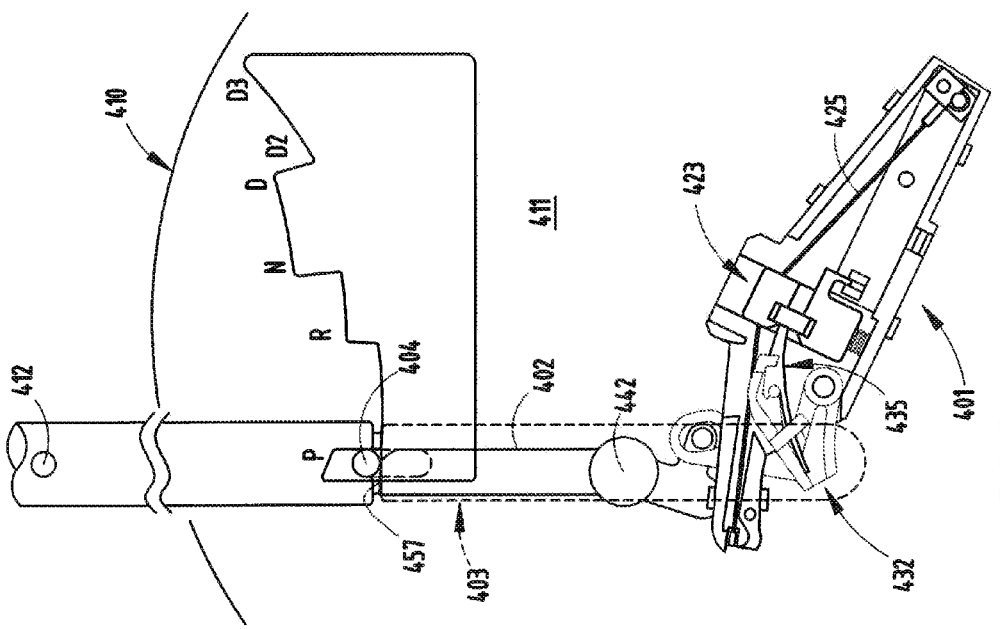
FIG. 36 is a side view of the shifter shown in FIG. 32, but with the SMA actuator positioned under the pawl to abut the pawl (and not abut the shift lever).

It is specifically contemplated that the present SMA actuator (including the slide member 423, bell crank 432, and blocking member 402 can be positioned on the side wall of the shifter base 410 for engaging the pawl 404 (see FIGS. 36-37) instead of the shift lever 403 (see FIG. 36). It is also contemplated that the arrangement can be constructed so that the SMA actuator is mounted on the shift lever, and the corresponding mating components being mounted on the shifter base.

Figure 32:
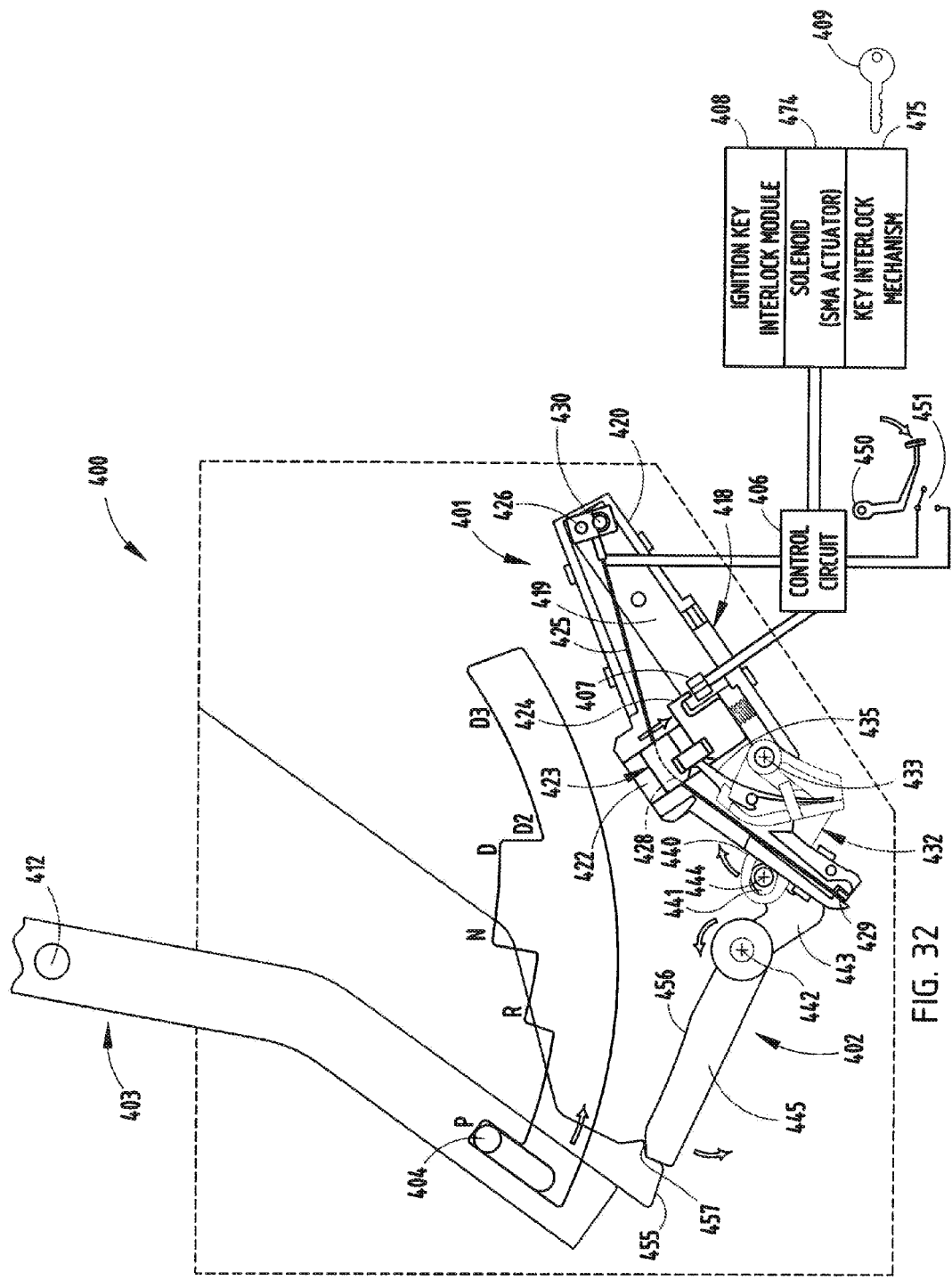
FIG. 32 is a side view, partially schematic, showing the present shifter with shape memory alloy (SMA) actuator for interlocking the shift lever in a park position until predetermined vehicle conditions are met.
Figure 32A:
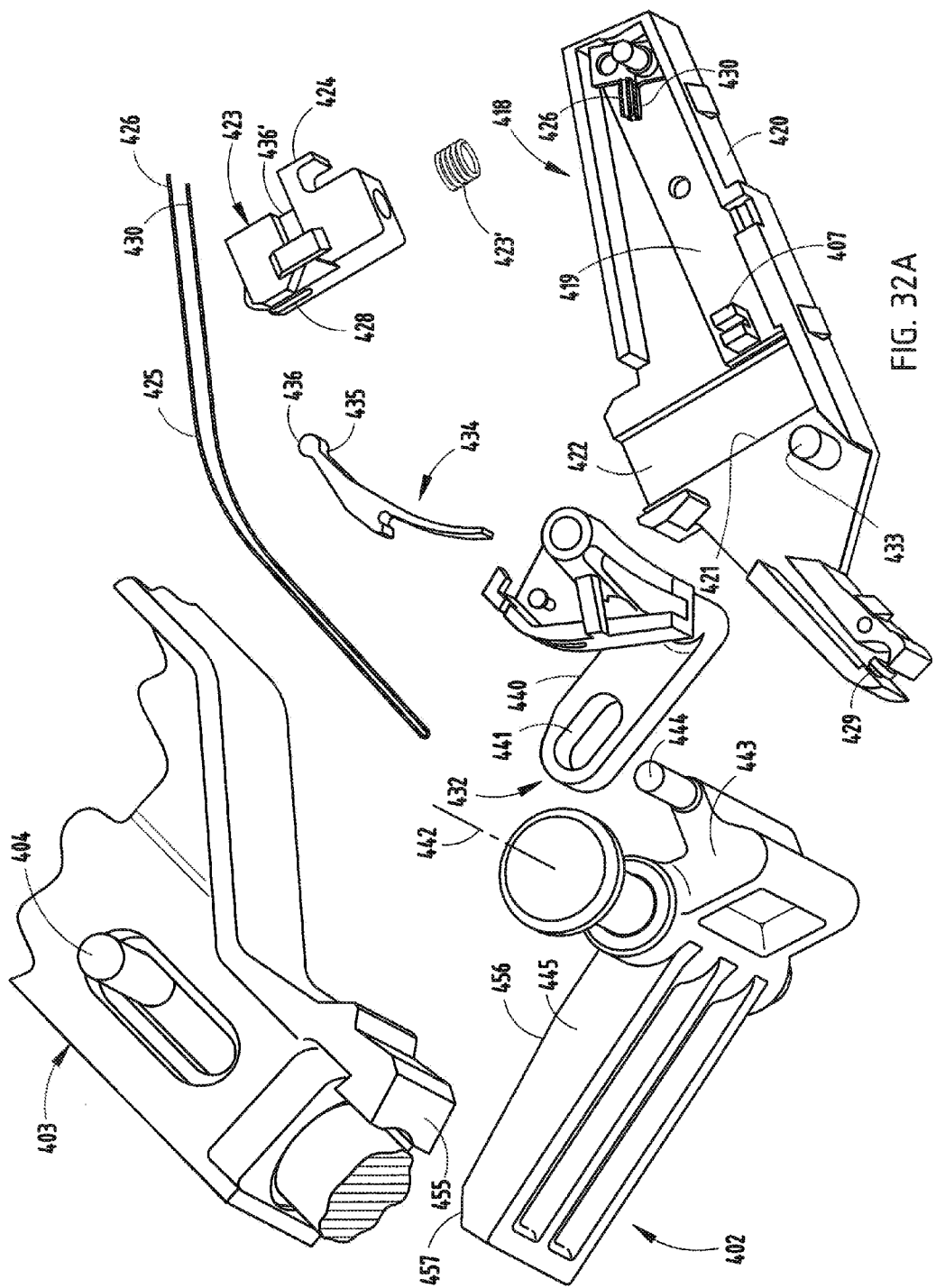
FIG. 32A is an exploded view of FIG. 32.
Figure 32B:
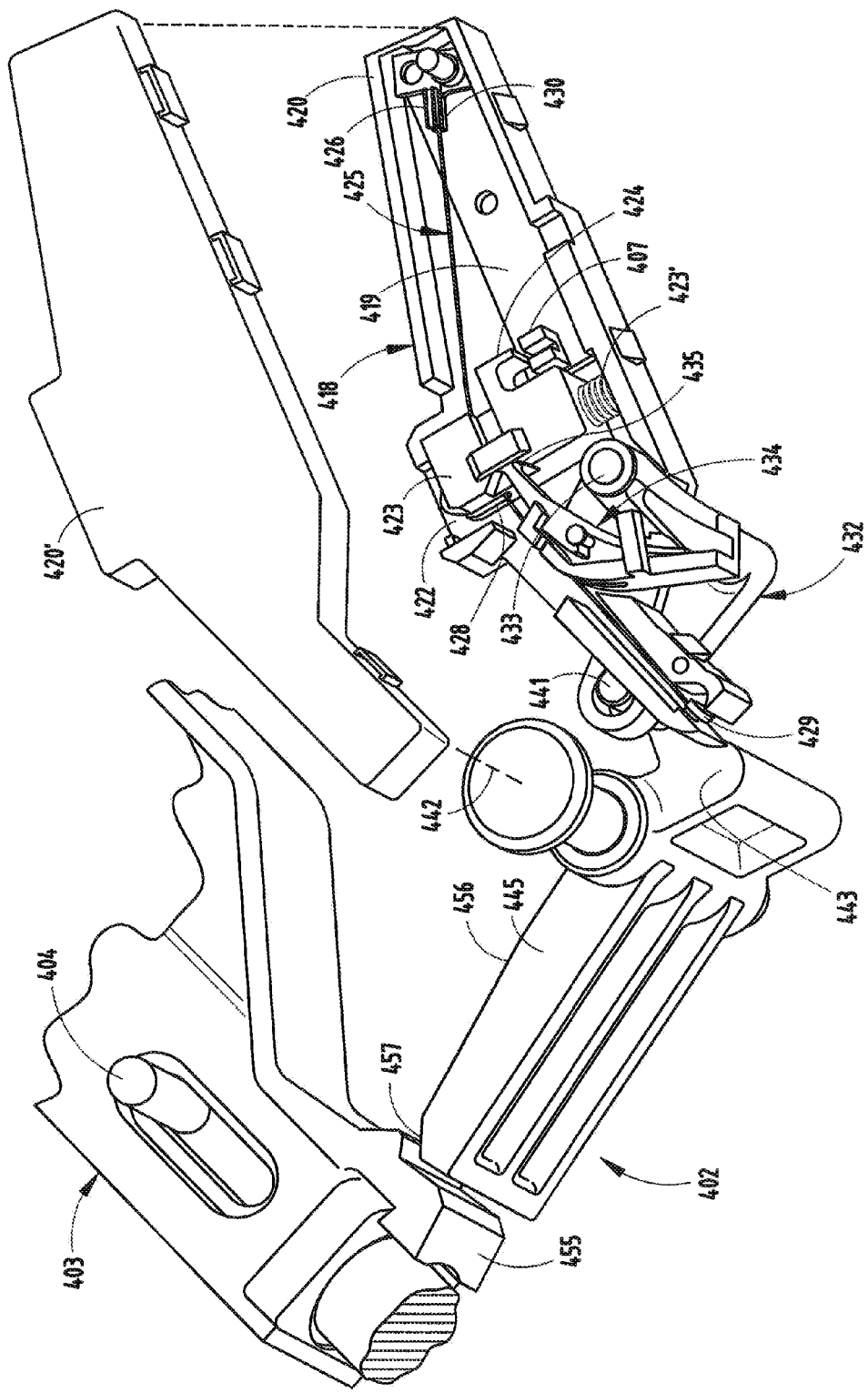
FIG. 32B is a perspective view of an SMA actuator module including the housing, the slide member, the SMA wire, the circuit board and sub-circuit, and the strain relief mechanism (bell crank with resilient spring arm).
Figure 33:
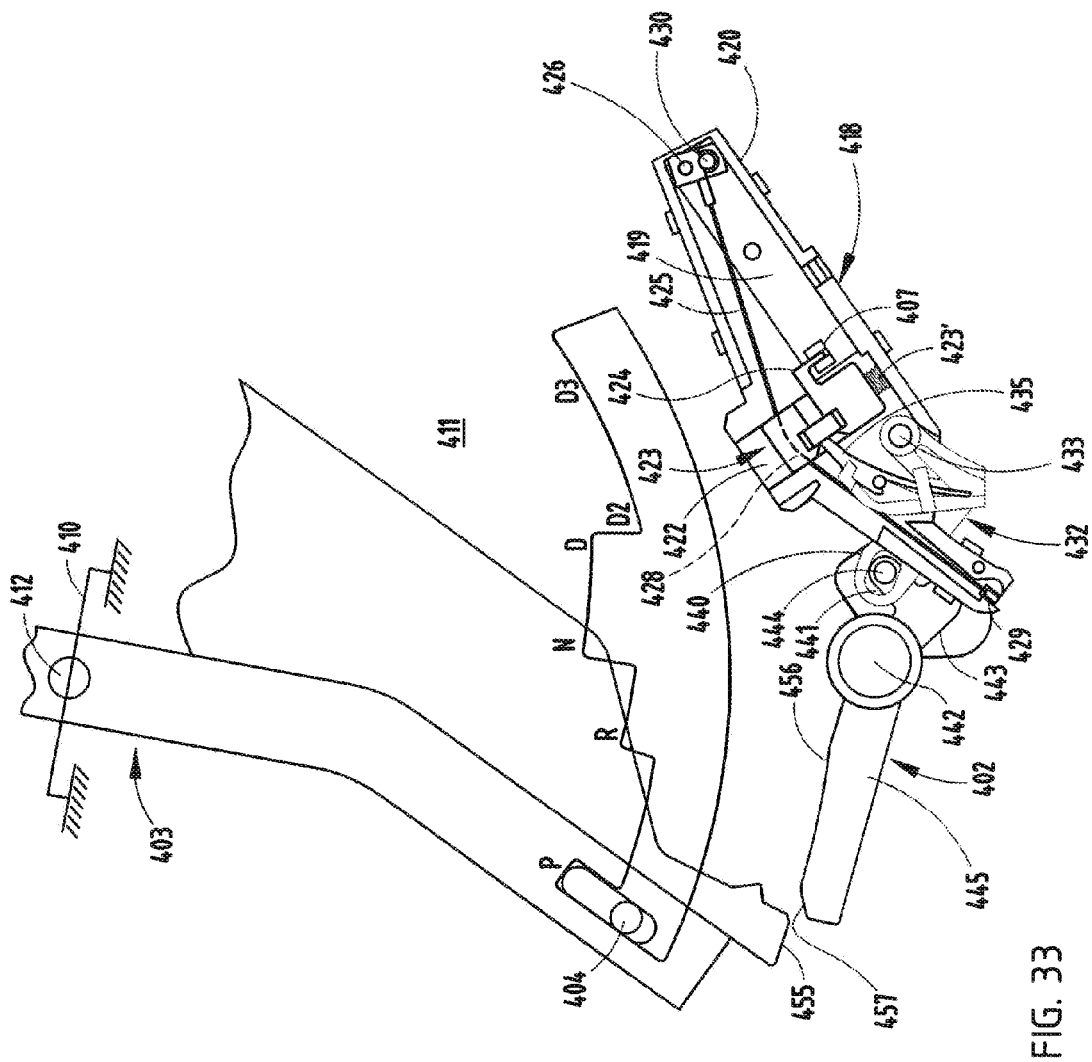
FIGS. 33-35 are side views similar to FIG. 32, but FIG. 33 showing the SMA actuator actuated to release the shift lever from park position P, FIG. 34 showing the shift lever moved out of park position P, and FIG. 35 showing a binding condition where the SMA actuator is activated but the blocking member cannot yet be moved away from the shift lever.
Figure 34:
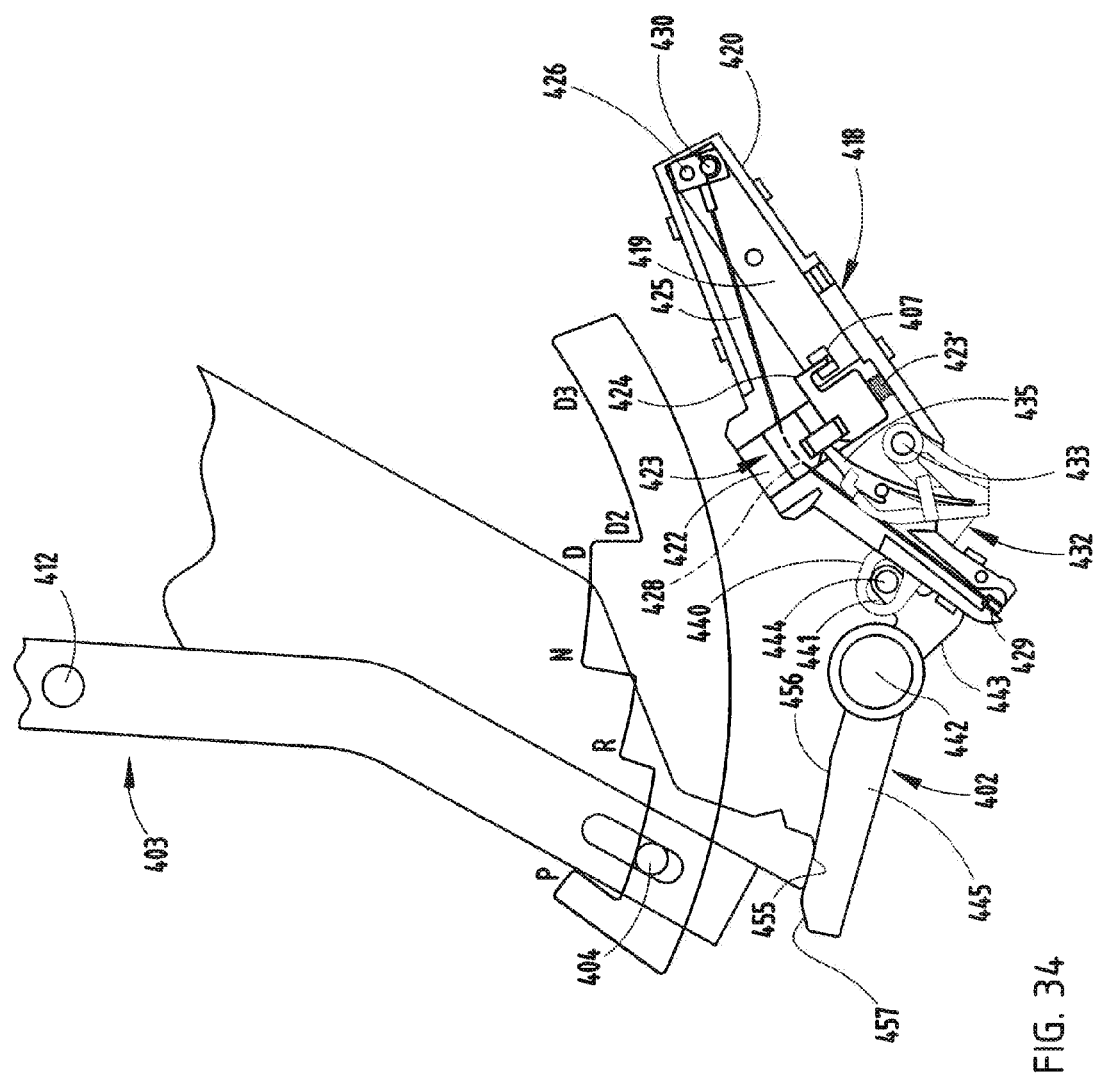
Figure 35:
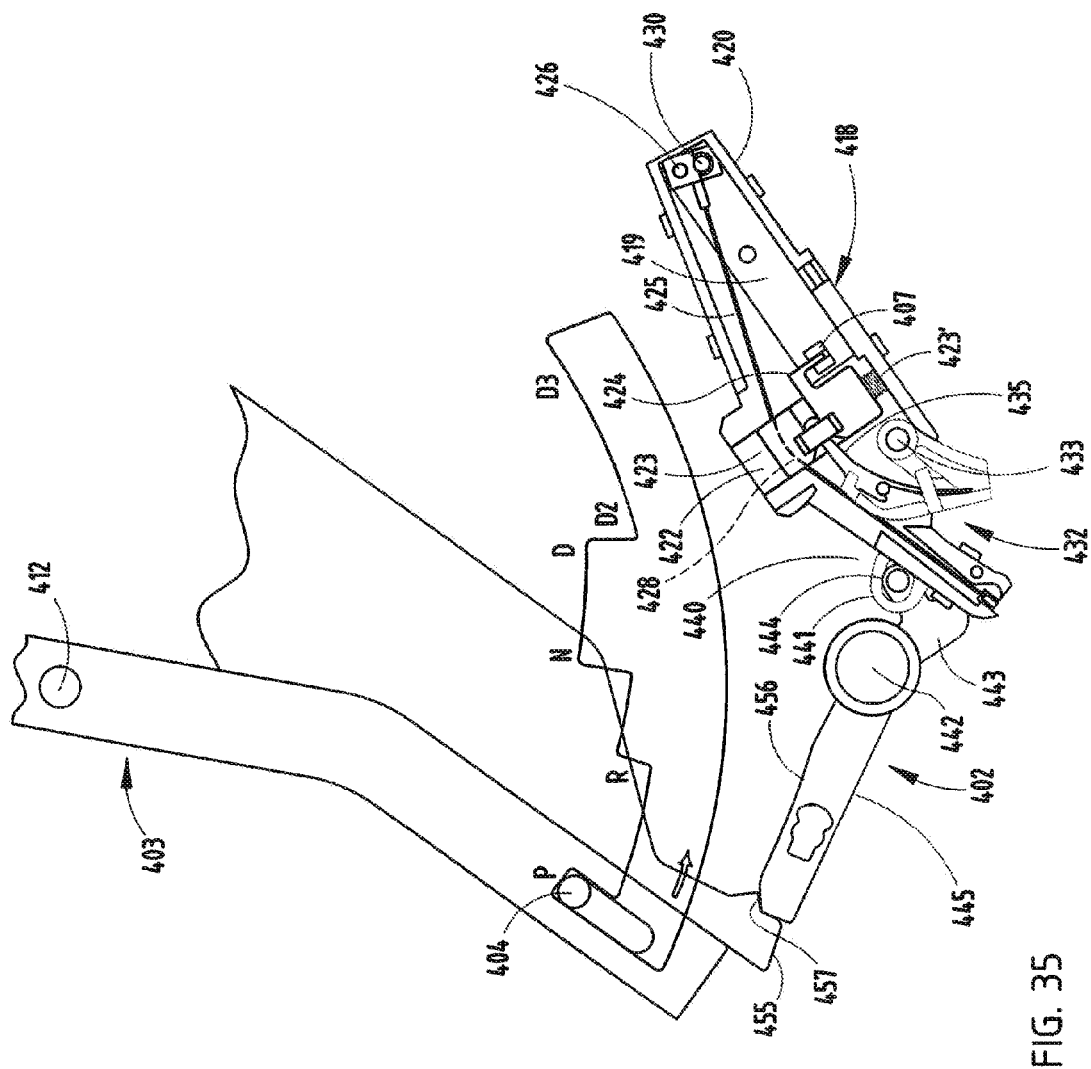
Figure 39:
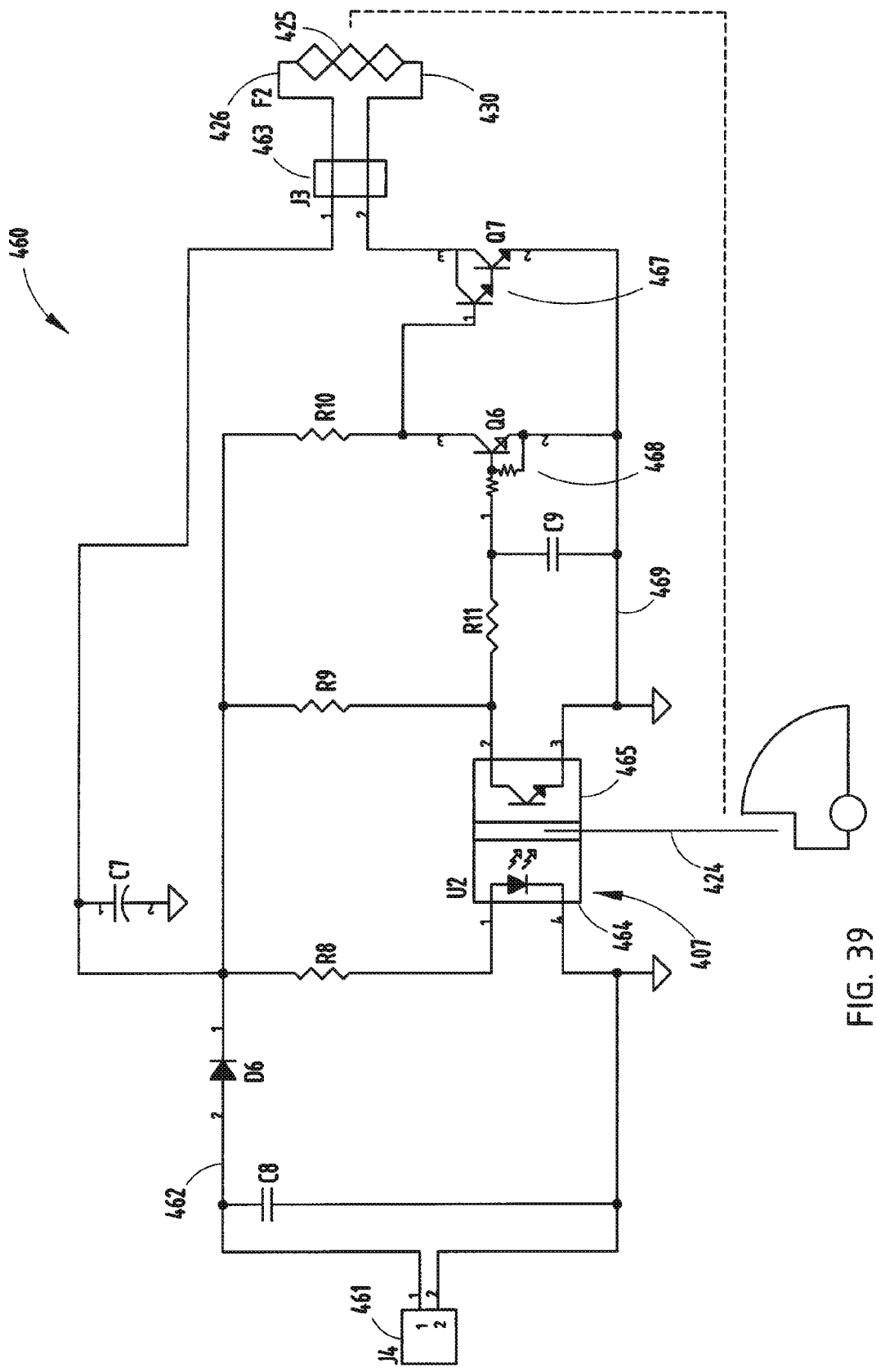
FIGS. 39 and 40 are electrical schematic drawings, FIG. 39 showing a sub-circuit for operating an SMA actuator, and FIG. 40 showing a sub-circuit including that shown in FIG. 39 and further including a key interlock branch.
Figure 40:
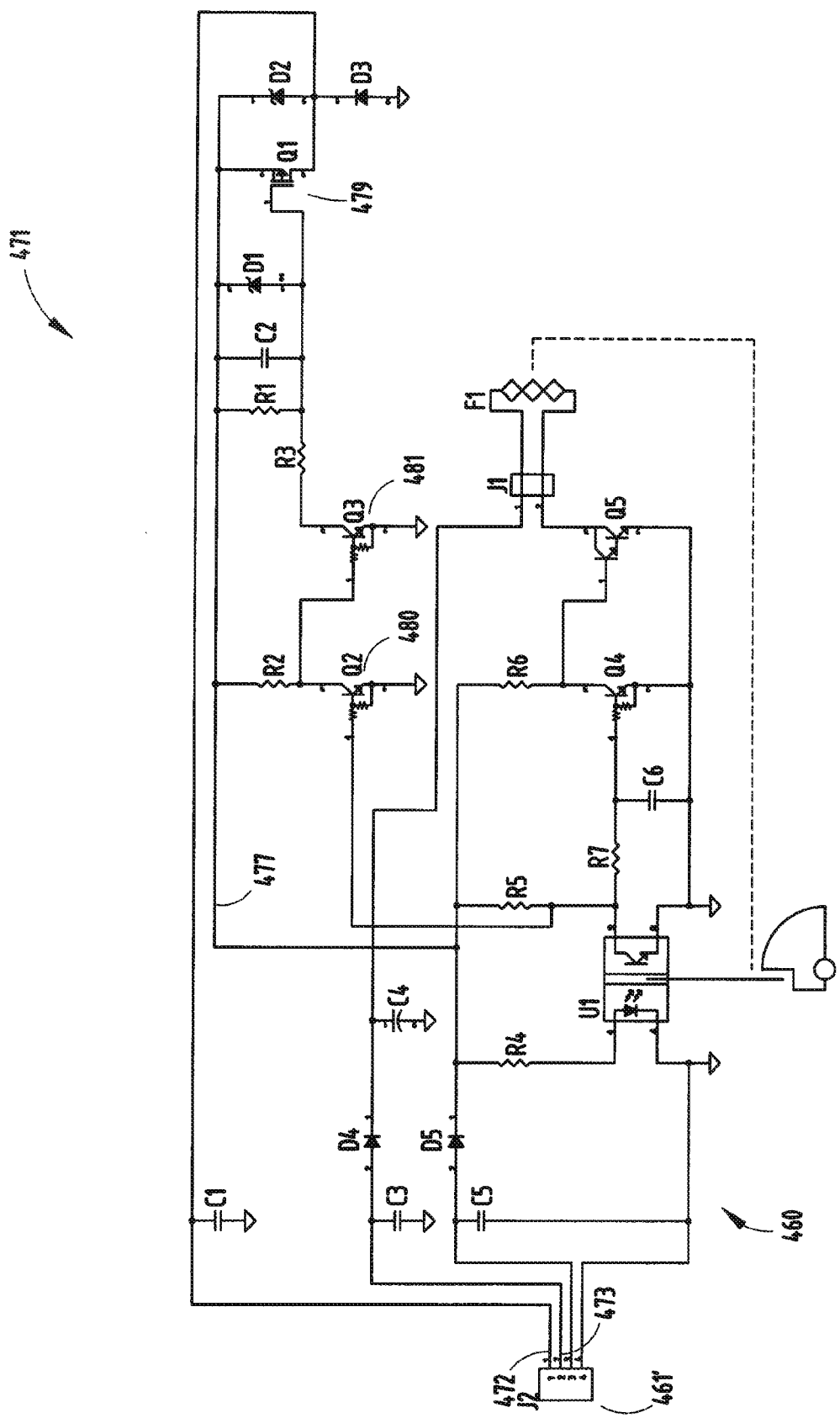

The control circuit 406 is schematically shown in FIG. 32. Details of a preferred sub-circuit thereof are shown in FIGS. 39 and 40. The sub-circuit 460 (FIG. 39) includes a two-pin connector 461 with an electrical power supply wire 462 leading to a second two-pin connector 463. The ends of the SMA wire 425 are connected to the two-pin connector 463. The photo-electric switch 407 (various types of which are commercially available) includes a first side 464 with LED for generating infrared light, and a second side 465 with sensors for sensing the presence of infrared light. The first side 464 is powered when power is supplied via the supply wire 462. The second side 465 is closed when it is powered via the supply wire 462 and when infrared light is sensed, thus causing electrical current to flow through the SMA "FLEXINOL™" wire 425 and through a transistor 467. When the light-blocking end of the arm 424 is moved to block the infrared light in the switch 407, the second side 465 is opened (i.e., the switch is opened, thus stopping current flow through it). The transistor 468 is arranged and connected to shut off the transistor 467 but to continue to provide power to the down-stream continued-power wire 469 until it is desired to shut off power to line 462 or to re-close the photo-electric switch 407 again (i.e., the light blocker is removed from the switch 407 by movement of the slide member 423 . . . which occurs when the shift lever 403 is back in its park position P).

The control circuit 406 includes the sub-circuit 460 (FIG. 39) and further adds an ignition key interlock sub-circuit 471 (FIG. 40). Key interlock modules are generally known in the art, such as shown in Osborn U.S. Pat. No. 5,211,271, the entire contents of which are incorporated herein. In FIG. 40, the connector 461' is a four pin connector, and includes two additional contacts 472 and 473 for connection to the key interlock actuator 474 (which can be a solenoid or an SMA actuator) on the ignition key interlock module 408 (FIG. 32). It is contemplated that this connection can be integrated into the vehicle electrical system for efficient connection and minimization of wiring and assembly time. The actuator 474 is configured to drive the key interlock mechanism 475, which can be an extendable pin, or magnetic clamp, or other gripping/retaining mechanism for retaining the ignition key 409. The sub-circuit 471 (FIG. 40) includes a power supply wire 477 connected to the down-stream continued-power wire 469. Transistors 479, 480 and 481 and additional components are arranged in sub-circuit 471 to maintain electrical power to the ignition key interlock module 408 (i.e., continuously retain the key 409) as long as the shift lever 403 is out of its park position P.

It is noted that the sub-circuits 460 and 471 include various electrical components such as diodes, capacitors, transistors, and resistors to control electrical spikes and current direction and voltage, such components being generally known in the art of vehicle electrical system design and thus not requiring a detailed description for a person skilled in this art other than as noted herein. For example, the illustrated circuits 460 and 471 include a capacitor to suppress high frequency electrical noise transmission from the switching circuit, and include diodes to prevent current back flow in a reverse direction.

It is noted that the switch for controlling the ignition key interlock module can be incorporated into the control circuit in a number of different ways, and the present example is but one of those ways. Further, it is contemplated that different switches can be used.

FIGS. 38-38A are side views of a modified shifter similar to FIG. 36, but with an additional (second) blocking member and biasing spring. FIG. 38 shows a pawl-locked condition, FIG. 38A shows a blocking member 402 moved to a pawl-unlocked condition and the pawl 404 depressed out of the park position notch and moved to a drive gear position. Specifically, a second blocking member 490 is positioned on a side wall 411 of the shifter base 410 (see FIG. 33) for vertical linear movement, and is biased downwardly by a biasing spring 491 (FIG. 38B) against the pawl 404 and against a top surface of the blocking member 402. The blocking member 402 is pivoted to the side wall (411) and is positioned to engage a bottom of the pawl 404, preventing the pawl 404 from moving out of its park position P. An SMA actuator 401 is connected to a lower end of the blocking member 402 to control movement thereof. When the actuator 401 is activated and moves blocking member 402, the second blocking member 490 moves downward with the pawl 404 as pawl 404 is depressed by a vehicle driver. The secondary blocking member 490 moves due to gravity and/or due to the bias of spring 491 to a lower position, where the second blocking member 490 engages a side of the top of the first blocking member 402. This prevents the blocking member 402 from moving back to its pawl-blocking position until the second blocking member 490 is raised.

When the shift lever 403 is moved from a drive gear position (or other non-park position) to the park position P, the pawl 404 is positioned under the second blocking member 490. When the pawl 404 is released, the pawl's biasing spring overcomes the biasing spring 491 on the second blocking member 490, causing the pawl 404 and also the second blocking member 490 to move upwardly. This allows the first blocking member 402 to pivotally move back under the pawl 404 . . . thus preventing the pawl 404 from being moved downwardly until the vehicle conditions are met and the SMA actuator 401 is activated . . . so that the SMA actuator 401 again moves the first blocking member 402 to unblock movement of the pawl 404. It is noted that the second blocking member 490 is potentially optional, since the pawl 404 can abut a side of the first blocking member 402 as it travels from one of the gear shift positions back to the park position. However, in some shifter constructions, it may be preferable to more positively hold the first blocking member 402 out of the way . . . in which case the second blocking member 490 and spring 491 (or similar arrangement) can be used.

To summarize, by means of the above circuit, the present lever inhibit shift system blocks the shift lever in its park position P. In the lever blocking arrangement (FIGS. 32-36), the vehicle's brake is depressed to close a brake pedal switch to energize the SMA actuator, thus moving the blocker to a lever-releasing position. Once the shift lever leaves park position P, the blocking member is mechanically maintained in a position where the light is blocked in the photo-electric switch. The ignition key is locked by continuing to block the light in the photo-electric switch until the lever is placed back into the park position P, . . . allowing the blocking member to return to its lever-locking position. This opens the photo-electric switch and unlocks the ignition key retention mechanism . . . allowing the ignition key to be removed. In the pawl-blocking arrangement (FIG. 37), the blocking member blocks the pawl, holding it in the park position notch P. When the brake pedal is depressed, the brake switch closes and energizes the SMA actuator . . . moving the blocking member to an unlocked position to release the pawl . . . and which locks the ignition key in place due to blocking light in the photo-electric switch and in turn powering the ignition key interlock mechanism. The blocking member is held in its pawl-released position until the shift lever is again placed back in the park position P and the pawl re-engaged with the park position notch P. The blocking member can be held in its pawl-released position by various means, such as by using a second spring and second blocking member that interact with the first blocking member to hold the first blocking member until the shift lever is returned to the park position P. For example, the pawl spring that biases the pawl upwardly is constructed to overcome the force of the second spring to drive the second blocker upwardly, thus allowing the pawl to return to a seated position in the park position P. (i.e., It is driven against the pawl spring by the thumb button on the shift lever knob.)

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A shifter comprising:
a shifter base including notches defining gear shift positions and a park position;
a shift lever pivoted to the base and including a pawl for selectively engaging the notches to control movement of the shift lever between at least some gear shift positions and the park position; and
an actuator comprising a housing, a sliding member slidably mounted to the housing, a slide-biasing spring biasing the sliding member, a first blocking member having a home position for blocking one of the pawl and the lever in the park position and movable to a pawl-released position, a length of shape memory alloy wire attached to the housing and operably engaging the sliding member to move the sliding member against the slide-biasing spring when current is passed through the wire, and a control circuit controlling current flow to the shape memory alloy wire, the control circuit including at least one switching element in communication with the first blocking member so that the switching element changes states when the first blocking member is moved from the home position.

2. A shifter of claim 1, including a second blocking member for holding the first blocking member in the pawl-released position when the pawl is depressed and the shift lever is moved from the park position to another gear position.

3. A shifter of claim 2, including a second spring biasing the second blocking member into a holding position to hold the first blocking member in the pawl-released position until the shift lever is moved back to the park position and until the pawl, biased by the pawl-biasing spring, biases the second blocking member away from the holding position to a rest position where the first blocking member can move back to the home position.

4. The shifter of claim 1, including a strain relief mechanism in communication between the first blocking member and the sliding member to allow relative movement of the shape memory alloy wire when the first blocking member is mechanically restricted.

5. The shifter of claim 1, wherein an output of the at least one switching element controls at least one of the shape memory alloy wire and a functional device such as a solenoid or a second switching element.

6. The shifter of claim 5, wherein the functional component is a key interlock mechanism connected to the control circuit and that is adapted to hold an ignition key within an ignition switch until the shift lever is back in the park position.

7. The shifter of claim 1, wherein the at least one switching element includes a first switching element that generates an output, and a second switching element that operates based on the output from the first switching element.

8. The shifter of claim 1, wherein the control circuit includes a capacitor to suppress high frequency electrical noise transmission from the switching element.

9. An apparatus comprising:
a shifter base defining gear shift positions including a park position;
a shift lever with spring-biased pawl;
a blocker positioned to selectively prevent movement out of the park position by engaging one of the shift lever and the pawl;
an actuator including a shape memory alloy wire for controlling movement of the blocker between a locking position preventing movement out of the park position and a release position permitting movement out of the park position; and
a control circuit connected to the actuator and adapted for connection to vehicle sensors to operate when predetermined vehicle conditions are met, the control circuit including a switch movable from a home position to a second position upon moving one of the lever or the pawl, the switch being electrically connected to the actuator and also to a vehicle functional component for affecting controlled operation of the actuator and the functional component.

10. The shifter of claim 9, wherein the control circuit includes a capacitor to suppress high frequency electrical noise transmission from the switching element.

11. The shifter of claim 9, wherein the functional component is a key interlock mechanism with an actuator connected to the control circuit that is adapted to hold an ignition key within an ignition switch until the shift lever is back in the park position.

12. An apparatus comprising:
a shifter base defining gear shift positions including a park position;
a shift lever with spring-biased pawl;
a blocker positioned to selectively prevent movement out of the park position by engaging one of the shift lever and the pawl;
a bell crank engaging the blocker;
an actuator including shape memory alloy wire for operating the bell crank to control movement of the blocker between a locking position preventing movement out of the park position and a release position permitting movement out of the park position;
a control circuit for controlling the actuator; and
a strain relief mechanism on one of the blocker, the bell crank, and the actuator that is configured to allow movement of the actuator without corresponding movement of the blocking member to thus avoid damage to the shape memory alloy wire.

13. The apparatus of claim 12, wherein the strain relief mechanism includes a resiliently bendable elongated spring that extends between a sliding member and the bell crank.

* * * * *